United States Patent
Lee et al.

(10) Patent No.: US 12,242,854 B2
(45) Date of Patent: Mar. 4, 2025

(54) COMPRESSING INSTRUCTIONS FOR MACHINE-LEARNING ACCELERATORS

(71) Applicant: Meta Platforms, Inc., Menlo Park, CA (US)

(72) Inventors: Kyong Ho Lee, Los Altos, CA (US); Miguel Angel Guerrero, Palo Alto, CA (US); Varun Agarwal, Pleasanton, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 72 days.

(21) Appl. No.: 18/172,016

(22) Filed: Feb. 21, 2023

(65) Prior Publication Data
US 2024/0281253 A1 Aug. 22, 2024

(51) Int. Cl.
*G06F 9/30* (2018.01)
(52) U.S. Cl.
CPC ...... *G06F 9/30185* (2013.01); *G06F 9/30178* (2013.01)
(58) Field of Classification Search
CPC ... G06F 9/30178; G06F 9/30156; H03M 7/46
See application file for complete search history.

(56) References Cited

U.S. PATENT DOCUMENTS

| | | | | |
|---|---|---|---|---|
| 5,901,310 | A | * | 5/1999 | Rahman ............ H03M 7/46 713/1 |
| 2014/0019714 | A1 | * | 1/2014 | Ould-Ahmed-Vall ........ G06F 9/30018 712/4 |
| 2014/0129801 | A1 | * | 5/2014 | Ould-Ahmed-Vall ........ G06F 9/30036 712/4 |
| 2016/0019064 | A1 | * | 1/2016 | Brooks ............ G06F 9/30018 712/226 |
| 2018/0145910 | A1 | * | 5/2018 | Mester ............. H04L 45/7453 |
| 2019/0253072 | A1 | * | 8/2019 | McMichael ........ H03M 7/24 |
| 2020/0257652 | A1 | * | 8/2020 | Wang ................ G06N 3/08 |
| 2020/0273020 | A1 | * | 8/2020 | Mackie ............. G06Q 20/341 |

* cited by examiner

*Primary Examiner* — Keith E Vicary
(74) *Attorney, Agent, or Firm* — Greenberg Traurig, LLP

(57) ABSTRACT

In one embodiment, a method for accessing an instruction that is to be executed by a control agent within a computing system may include decompressing the instruction by replacing each of one or more zero-symbol run-length fields in the instruction with as many continuous zero symbols as its corresponding value and removing one or more non-zero-symbol run-length fields from the instruction. The method may also include determining that the instruction is spatial-delta-encoded based on a compression data header associated with the instruction, performing spatial-delta decoding on the instruction in response to the determination by orderly determining a spatial-delta-decoded value of each bit in the instruction, and causing the instruction to be sent to the control agent.

20 Claims, 21 Drawing Sheets

COMPRESSING INSTRUCTIONS FOR MACHINE-LEARNING ACCELERATORS

TECHNICAL FIELD

This disclosure generally relates to computing systems for accelerating machine-learning computations and, more particularly, to compressing instructions for computing systems for accelerating machine-learning computations.

BACKGROUND

Neural networks are increasingly being used to implement machine-learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Some other neural networks, which may be referred to as Transformer networks, include self-attention layers. The self-attention layers may also require significant computations and data movement within the self-attention layers and/or between the self-attention layers and other elements of an ML model. Therefore, existing ML accelerators, computing systems for accelerating ML computations, focus on using high compute parallelism along with an optimized data orchestration throughout the memory hierarchy to speed up the processing of convolutional layers or self-attention layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Particular embodiments described herein relate to systems and methods for compressing tensor instructions for a machine-learning accelerator. A compiler may generate tensor instructions based on inputs including programming language instructions and configuration information associated with the machine-learning accelerator. The generated tensor instructions may be stored on a storage. An instruction master within the machine-learning accelerator may fetch the generated tensor instructions from the storage. The instruction master may distribute the fetched tensor instructions to one or more corresponding control agents within the machine-learning accelerator. The tensor instructions may be considerably long. A long tensor instruction may consume the storage space as well as the bandwidth for carrying the tensor instructions from the compiler to the storage, from the storage to the instruction master, and from the instruction master to the control agents. The tensor instructions may include considerable number of consecutive zero symbols because a tensor instruction may comprise one or more fields that are not used for the tensor instruction. Also, consecutive two tensor instructions belonging to a single control agent may have similar symbol streams. Because of such characteristics of the tensor instructions, a size of a tensor instruction may be significantly reduced when the tensor instruction is compressed. The reduced size of the tensor instruction may save the storage space and the bandwidth required to transmit the tensor instruction.

In particular embodiments, a computing system for accelerating machine-learning computations may comprise one or more control agents and an instruction master. The computing system may be referred to as a machine-learning accelerator. The one or more control agents may be hardware control agents. A compiler associated with the machine-learning accelerator may generate, encode, and compress an instruction that is to be executed by one of the one or more control agent. The compiler may generate the instruction based on inputs including programming language instructions and configuration information. The compiler may perform a temporal-delta encoding on a later instruction among two consecutive instructions that are to be performed by a single control agent. The temporal-delta encoding may comprise performing bitwise exclusive OR operations between the two consecutive instructions. In particular embodiments, the compiler may perform a spatial-delta encoding on a later bit among two consecutive bits within an instruction. The spatial-delta encoding may comprise performing an exclusive OR operation between the two consecutive bits in the instruction. In particular embodiments, the compiler may compress an instruction by replacing one or more consecutive zero symbols in the instruction with a zero-symbol run-length field and adding a non-zero-symbol run-length field in front of one or more consecutive non-zero symbols in the instruction. The zero-symbol run-length field may indicate a number of the one or more consecutive zero symbols. The non-zero-symbol run-length field may indicate a number of the one or more consecutive non-zero symbols. A run-length field may comprise zero or more extension-indicating blocks followed by a value block. A size of an extension-indicating block may be identical to a size of a value block. An extension-indicating block may contain a pre-determined bit pattern indicating a pre-determined value. A value of the run-length field may be determined by the pre-determined value times a number of extension-indicating blocks plus a value encoded in the value block.

In particular embodiments, the instruction master may be communicably coupled to the one or more control agents over an instruction bus. The instruction master may be configured to access an instruction that is to be executed by a control agent among the one or more control agents. The instruction master may be configured to determine whether the instruction is compressed based on a compression data header associated with the instruction. Based on the determination, the instruction master may be configured to decompress the instruction by replacing each of one or more zero-symbol run-length fields in the instruction with as many continuous zero symbols as its corresponding value and removing one or more non-zero-symbol run-length fields from the instruction. The compression data header may indicate whether the compressed instruction starts with one or more consecutive non-zero symbols. The compressed instruction may comprise one or more zero-symbol run-length fields. A zero-symbol run-length field may indicate a number of consecutive zero symbols. The compressed instruction may comprise one or more consecutive non-zero symbols preceded by a non-zero-symbol run-length field indicating a number of the one or more consecutive non-zero symbols. The instruction master may determine that the instruction is spatial-delta-encoded based on the compression data header associated with the instruction. In response to the determination, the instruction master may perform spatial-delta decoding on the instruction by orderly determining a spatial-delta-decoded value of each bit in the instruction. A spatial-delta-decoded value of a bit may be determined to be identical to a value of an immediately preceding bit when an encoded bit value is zero. A spatial-delta-decoded value of a bit may be determined to be opposite of the value of the immediately preceding bit when the encoded bit value is one. The instruction master may cause the instruction to be sent to the control agent.

In particular embodiments, the control agent may perform a temporal-delta decoding on at least a part of the instruction when a header of the instruction indicates that the instruction is temporal-delta-encoded. A temporal-delta-decoded value of each bit within the at least part of the instruction may be determined to be identical to a value of a corresponding bit of an immediately preceding instruction when a temporal-delta-encoded value of the bit is zero. The temporal-delta-decoded value of each bit within the at least part of the instruction may be determined to be opposite of the value of the corresponding bit of the immediately preceding instruction when the temporal-delta-encoded value of the bit is one.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

DESCRIPTION OF EXAMPLE EMBODIMENTS

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
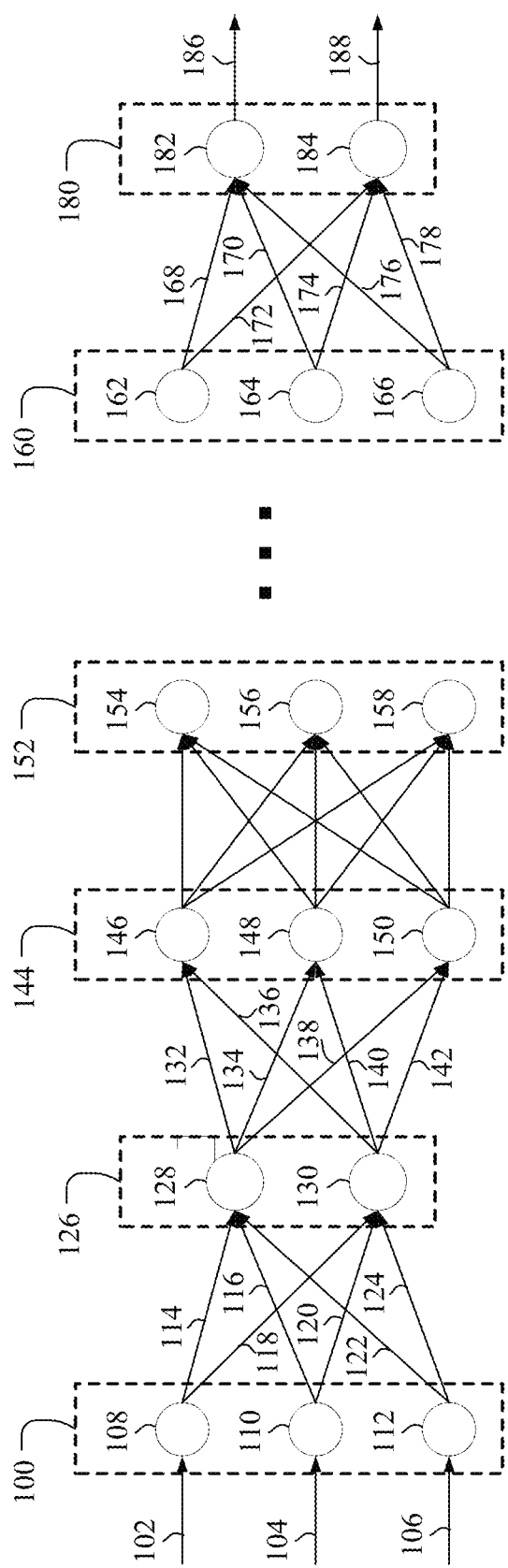
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 100 that receives a set of inputs or a vector input to an output layer 180 that includes a set of outputs or a vector output. Each layer may include any given number of nodes, which are herein illustratively shown as circles within each layer. For example, input layer 100 includes three nodes, shown as nodes 108 110, and 112, and output layer 180 includes two nodes, shown as 182 and 184. The example neural network illustrated in FIG. 1 includes at least four hidden layers but may include additional hidden layers not shown in FIG. 1. In the illustrated example, the first hidden layer 126 includes two nodes, shown as nodes 128 and 130, while hidden layers 144, 152, and 160 each include three nodes, shown as nodes 146, 148, and 150, nodes 154, 156, and 158, and nodes 162, 164, and 166, respectively. Generally, the deeper the MLP (e.g., the greater the number of hidden layers in the MLP), the greater its capacity to learn. The input layer 100 receives a vector input, illustratively shown as a three-dimensional vector consisting of inputs 102, 104 and 106, and may apply the received vector input to the first hidden layer 126 in the sequence of hidden layers. The output layer 180 receives the output from the last hidden layer in the multilayer model, e.g., 160, processes its inputs, and produces a vector output result, illustratively shown as a two-dimensional vector consisting of outputs 186 and 188.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 100 may receive only one input and may be passive, meaning that each node may simply relay the value of its single input to its output(s) thus providing a copy of the input to the output(s).

In the example neural network illustrated in FIG. 1, the outputs of nodes 108, 110, and 112 of input layer 100 feed forward as inputs to hidden layer 126, which includes nodes 128 and 130. The outputs of nodes 128 and 130, in turn, feed forward as inputs to hidden layer 144, which includes nodes 146, 148, and 150, the outputs of nodes 146, 148, and 150 feed forward as inputs to hidden layer 152, which includes nodes 154, 156, and 158, and so on. Finally, the outputs of nodes 162, 164, and 166 of the final hidden layer 160 feed forward as inputs to output layer 180, which includes nodes 182 and 184. Interconnections, or links, between neurons, shown in FIG. 1 as arrows between various nodes, may have respective weights associated with them. For example, the interconnection between node 108 of input layer 100 and node 128 of hidden layer 126 may be associated with a weight 114. In addition, the interconnection between node 108 of input layer 100 and node 130 of hidden layer 126 may be associated with a weight 118, the interconnection between node 110 of input layer 100 and node 128 of hidden layer 126 may be associated with a weight 116, the interconnection between node 110 of input layer 100 and node 130 of hidden layer 126 may be associated with a weight 120, the interconnection between node 112 of input layer 100 and node 128 of hidden layer 126 may be associated with a weight 122, and the interconnection between node 112 of input layer 100 and node 130 of hidden layer 126 may be associated with a weight 124. Similarly, the interconnections between the nodes of hidden layers 126 and 144 may be associated with weights 132, 134, 138, 136, 140, and 142, respectively, and the interconnections between the nodes of hidden layers 160 and output layer 180 may be associated with weights 168, 170, 172, 174, 176, and 178, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such as a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
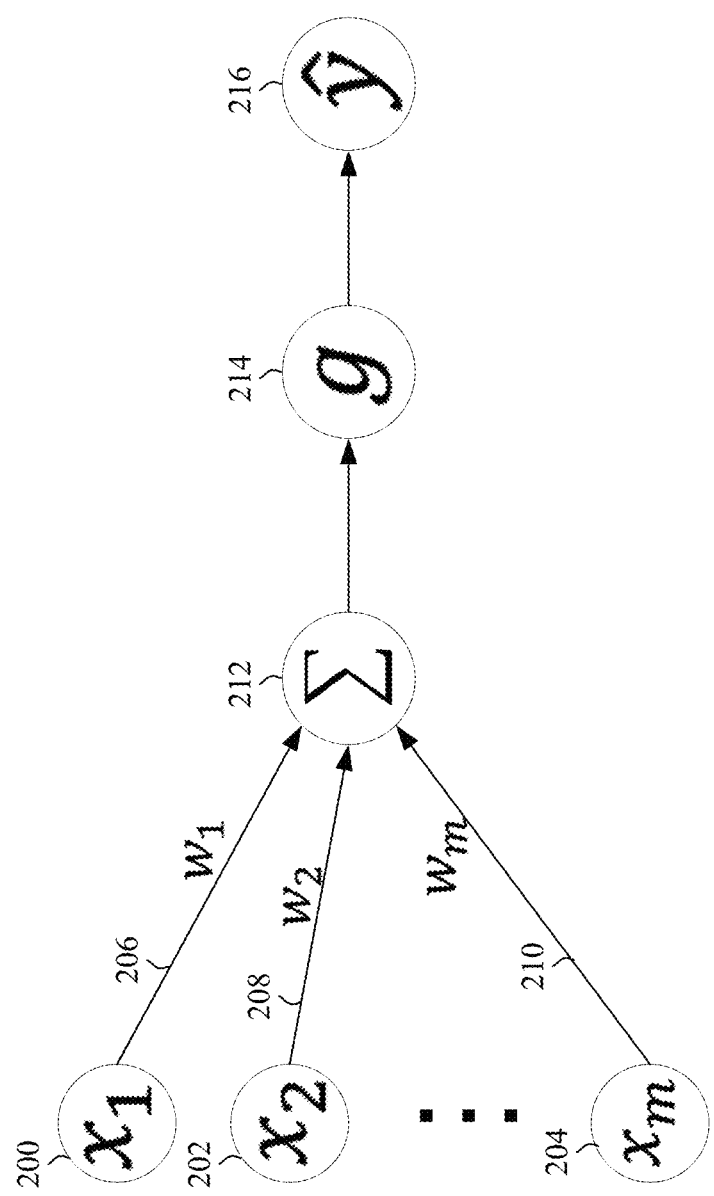
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector y for a particular neural network node given inputs $x_1$ (200), $x_2$ (202), and $x_m$ (204), respective interconnection weights $w_1$ (206), $w_2$ (208), and $w_m$ (210), and a non-linear activation function g (214). In the illustrated example, the output vector y may be determined by applying the activation function g (214) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feedforward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For example, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3A:
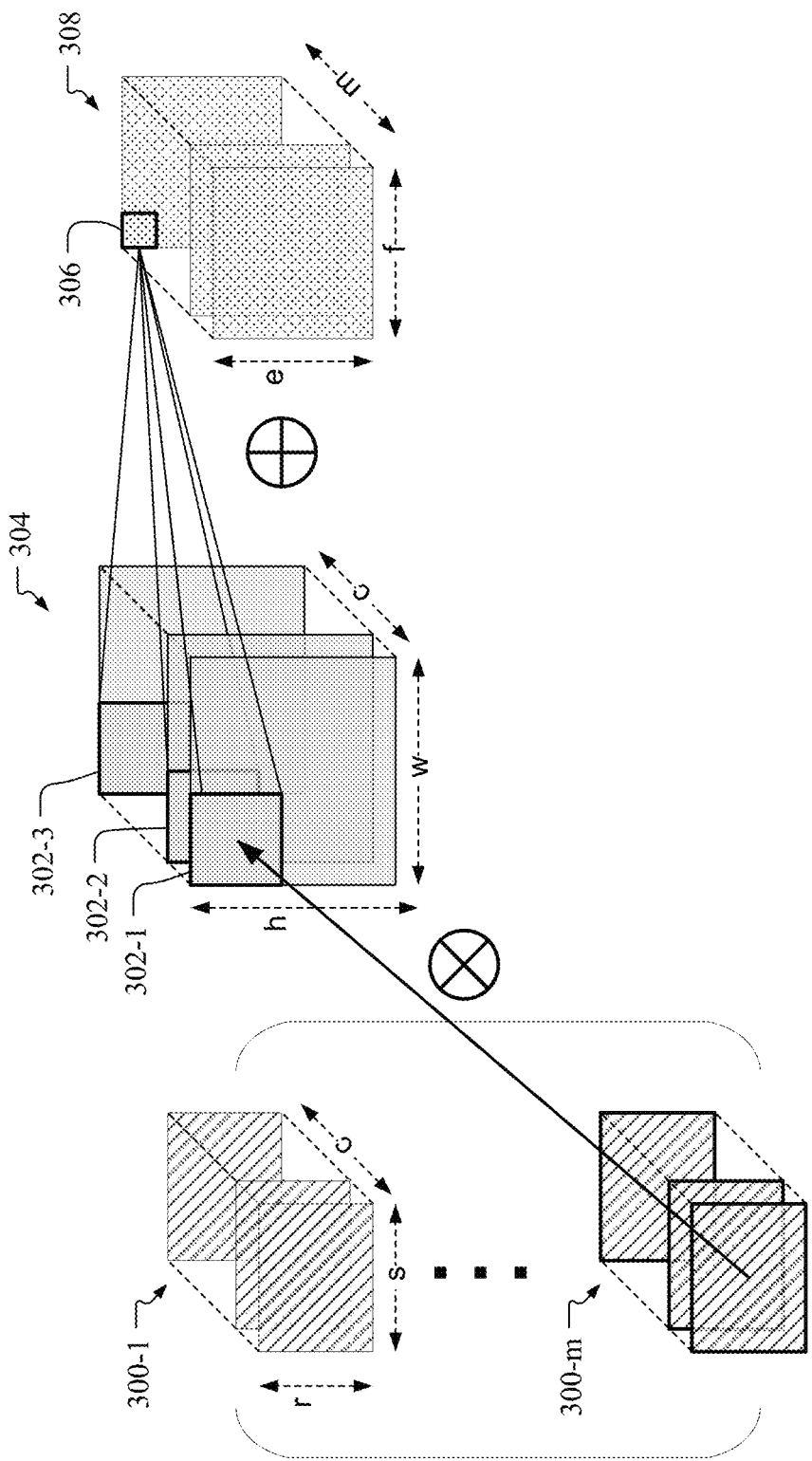
FIG. 3A illustrates selected elements of an example convolutional layer in a convolutional neural network (CNN).

FIG. 3A illustrates selected elements of an example convolutional layer in a convolutional neural network. In the illustrated example, a three-dimensional (3D) output feature map 308 is generated by performing a series of two-dimensional (2D) convolution operations over a 3D input feature map 304 using a collection of 2D convolution filters 300. More specifically, the input feature map 304 has dimensions h (height)×w (width)×c (where c represents the number of input channels) and the output feature map 308 has dimensions e×f×m (where m represents the number of output channels). In this example, multiple filters 300 are to be applied to the input feature map to generate each element, of each channel, of the output feature map. More specifically, a respective different filter 300 is applied to produce the elements of the output feature map for each given output channel. Therefore, the number of filters 300 (i.e., m) matches the number of output channels (m).

As shown in FIG. 3A, each 3D filter 300 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 304. More specifically, each 2D kernel of filter 300-$m$ is applied in a convolution operation over the elements in a respective channel of input feature map 304. For example, a first 2D kernel of filter 300-$m$ provides the weights that are multiplied by respective values of the elements in an r×s sized portion 302-1 of the elements of a first channel of input feature map 304, a second 2D kernel of filter 300-$m$ provides the weights that are multiplied by respective values of the elements in an r×s sized portion 302-2 of the elements of a second channel of input feature map 304, and so on, such that a final 2D kernel of filter 300-$m$ provides the weights that are multiplied by respective values of the elements in an r×s sized portion 302-3 of the elements of the last channel of input feature map 304. The results of these multiplication operations are then combined to generate a single element 306 of a single channel of output feature map 308, as shown in FIG. 3A. This process is repeated as the 2D kernels of filter 300-$m$ are applied to other portions of input feature map 304 to produce the remaining elements of output feature map 308 in the same output channel as element 306, and as the 2D kernels of respective other ones of the filters 300 are applied to input feature map 304 to produce the elements of output feature map 308 in each of the remaining output channels.

Figure 3B:
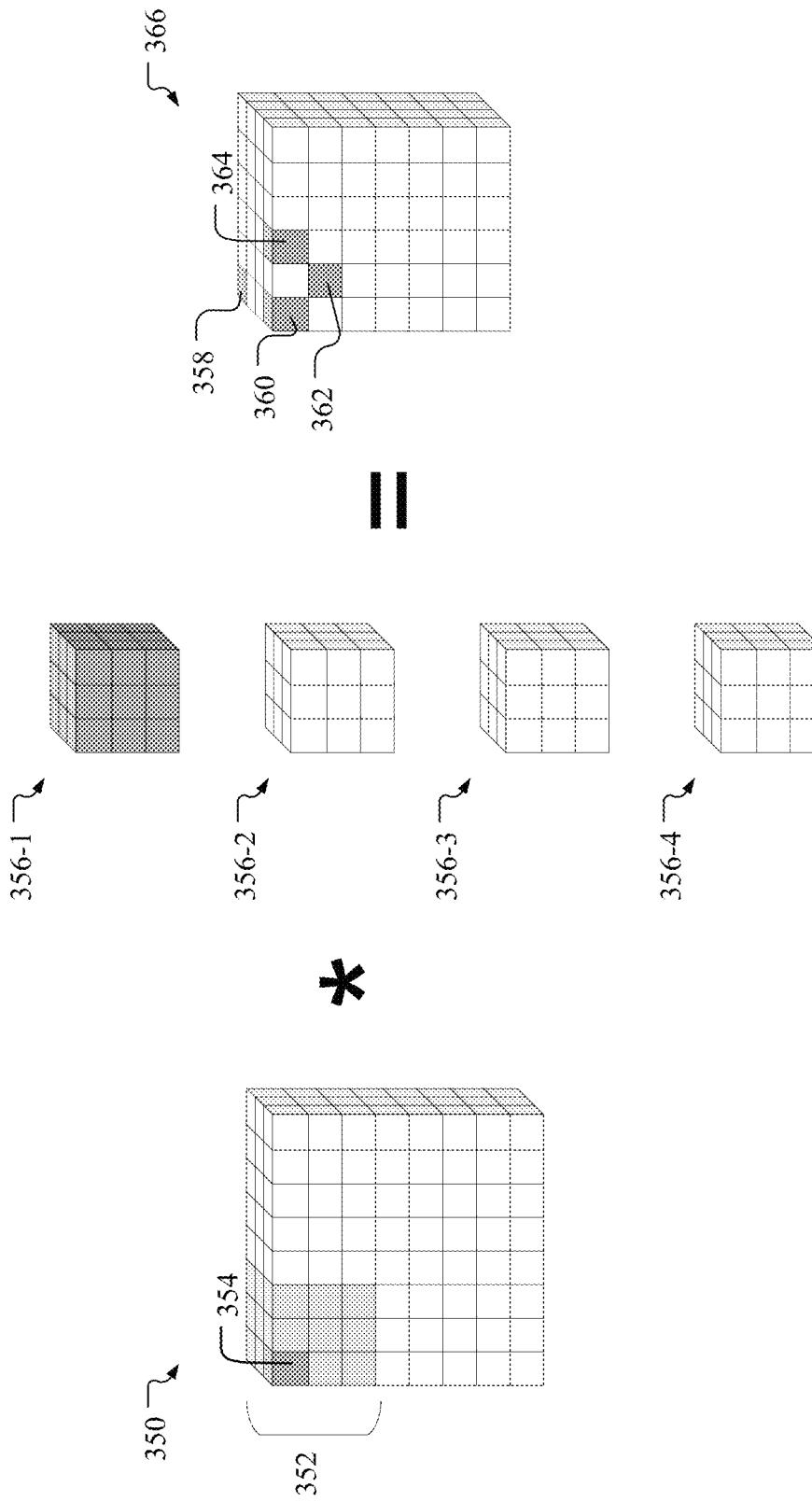
FIG. 3B illustrates an example multi-level convolution operation.

FIG. 3B illustrates an example multi-channel convolution operation, in accordance with particular embodiments. In this example, a multi-channel (3D) output feature map 366 is generated by the application of multiple 3D filters 356 to successive portions of a multi-channel (3D) input feature map 350. In this example, the dimensions of input feature map 366 are X×Y×Zin, where Zin represents the number of input channels, and the dimensions of output feature map 366 are Xout×Yout×Zout, where Zout represents the number of output channels. Each 3D filter 356 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 366 is computed as follows:

$$[x][y][zout] \mathrel{+}= \text{activations}[x+kx][y+ky][zin] * \text{weights}[kx][ky][zin][zout]$$

In the illustrated example, there is one 3D filter 356 for each channel (zout) in Zout. More specifically, the illustrated multi-channel convolution uses four 3D filters 356 to generate elements for each x/y position in each of four output channels, respectively, while sweeping the appropriate 2D kernels across and down the elements of input feature map 350 in each of the input channels. For example, the value of element 360 of output feature map 366 is determined by applying highlighted 3D filter 356-1 to the highlighted portion 352 of input feature map 350, i.e., 27 activations including 9 activations in respective x/y positions in each of 3 input channels zin. Similarly, the value of element 358 of output feature map 366 is determined by applying 3D filter 356-4 to the highlighted portion 352 of input feature map 350.

Traversing input feature map 350 in the x dimension involves sweeping the highlighted portion 352 across the input feature map such that element 354 moves one position to the right to identify a next set of activations for each successive iteration in the x dimension. For example, the value of element 364 of output feature map 366 is determined by applying 3D filter 356-1 to the highlighted portion 352 of input feature map 350 after the highlighted portion has been moved from the initial position in which it is shown in FIG. 3B to a location two positions to the right. Traversing input feature map 350 in the y dimension involves sweeping the highlighted portion 352 across the input feature map such that element 354 moves one position down to identify a next set of activations for each successive iteration in the y dimension. For example, the value of element 362 of output feature map 366 is determined by applying 3D filter 356-1 to the highlighted portion 352 of input feature map 350 after the highlighted portion has been moved from the initial position in which it is shown in FIG. 3B to a location one position down and one position to the right.

Performing the multi-channel convolution illustrated in FIG. 3B involves performing a series of 2D convolutions, as follows:

for zout in Zout
    for x in Xout

```
        for y in Yout
            for kx in KernelX
                for ky in KernelY
                    for zin in Zin
                        output[x][y][zout] +=
                        activations[x + kx][y + ky][zin] *
                        weights[kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

```
    for the activation addresses:
        for x in Xout
            for y in Yout
                for kx in KernelX
                    for ky in KernelY
                        for zin in Zin
                            activations[x + kx][y + ky][zin],
    for the weight addresses:
        for zout in Zout
            for kx in KernelX
                for ky in Kernel Y
                    for zin in Zin
                        weights[kx][ky][zin][zout],
    and for the output address:
        for zout in Zout
            for x in Xout
                for y in Yout
                    for zin in Zin
                        outputs[x][y][zout].
```

Figure 4A:
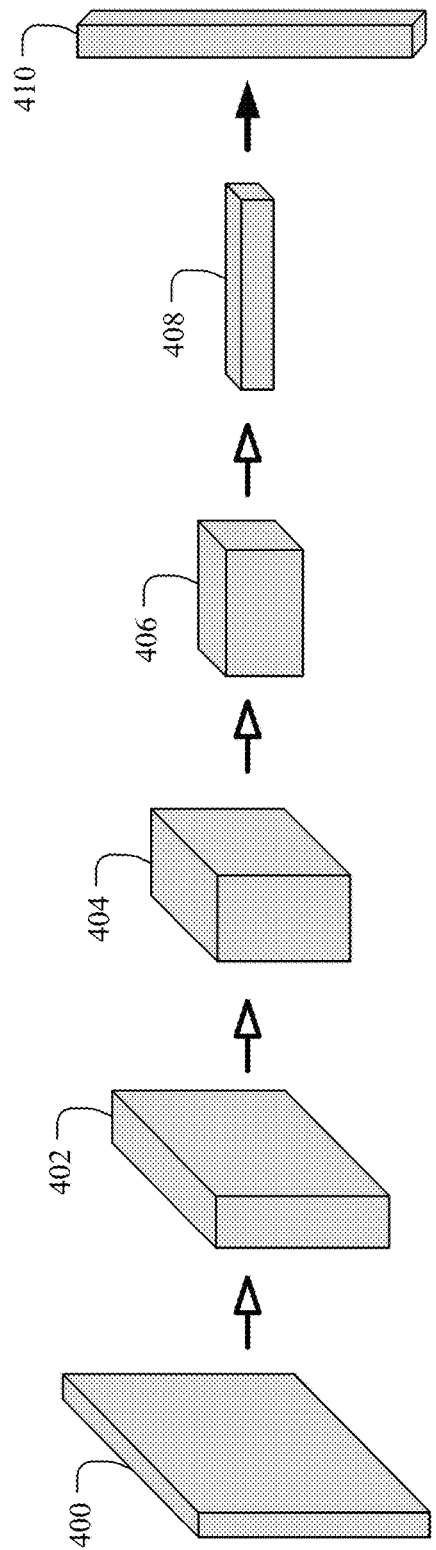
FIG. 4A illustrates an example CNN for a classification-type network.

FIG. 4A illustrates an example convolutional neural network in which an output feature map 410 is generated based on an input feature map 400 in a classification-type neural network. This type of neural network may typically involve a small or medium resolution input, a single vector output, and a relatively large number of output channels. In the illustrated example, intermediate feature maps of different sizes and shapes, shown as feature maps 402, 404, 406 and 408, are generated by performing successive convolution operations on each such intermediate feature map, in turn, and the output feature map 410 is generated by a fully connected (FC) layer operating on the final intermediate feature map 408. As shown in FIG. 4A, it may be typical for the overall size, and corresponding memory requirements, to be reduced for each successive intermediate feature map in a classification-type neural network.

Figure 4B:
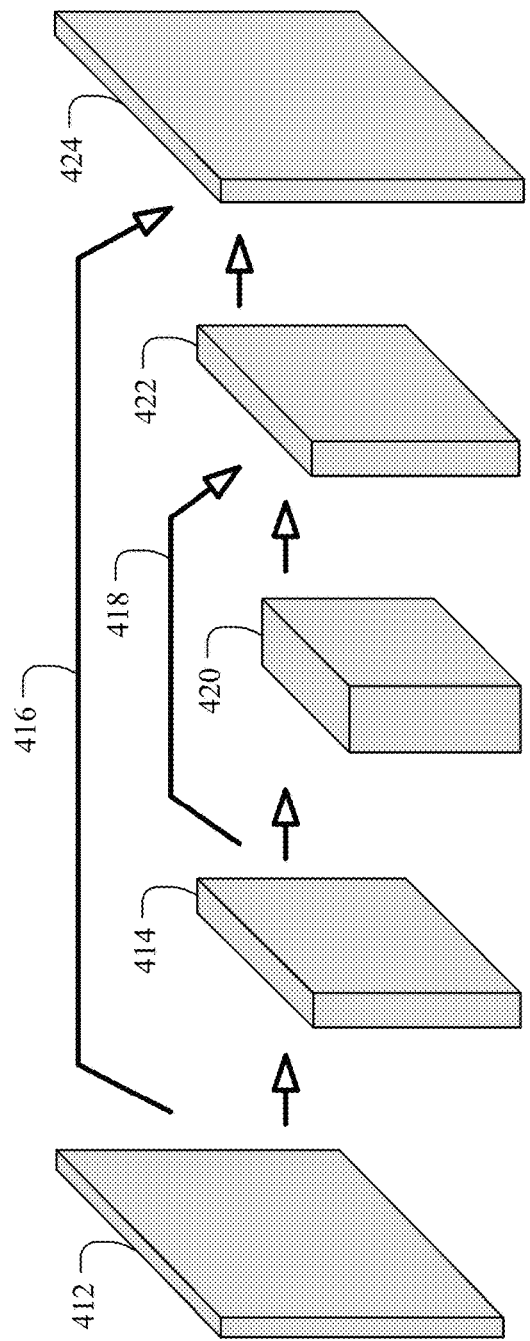
FIG. 4B illustrates an example CNN for a UNet-type network.

FIG. 4B illustrates an example CNN in which an output feature map 424 is generated based on an input feature map 412 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 416 and 418 in FIG. 4B. In the illustrated example, intermediate feature maps of different sizes and shapes, shown as feature maps 414, 420, and 422, are generated using a series of convolution operations prior to the generation of the output feature map 424. In this example, intermediate feature map 414 is generated based on input feature map 412, intermediate feature map 420 is generated based on intermediate feature map 414, intermediate feature map 422 is generated based on both intermediate feature map 420 and on intermediate feature map 414, and output feature map 424 is generated based on both intermediate feature map 422 and input feature map 412. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processor units within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

Figure 5A:
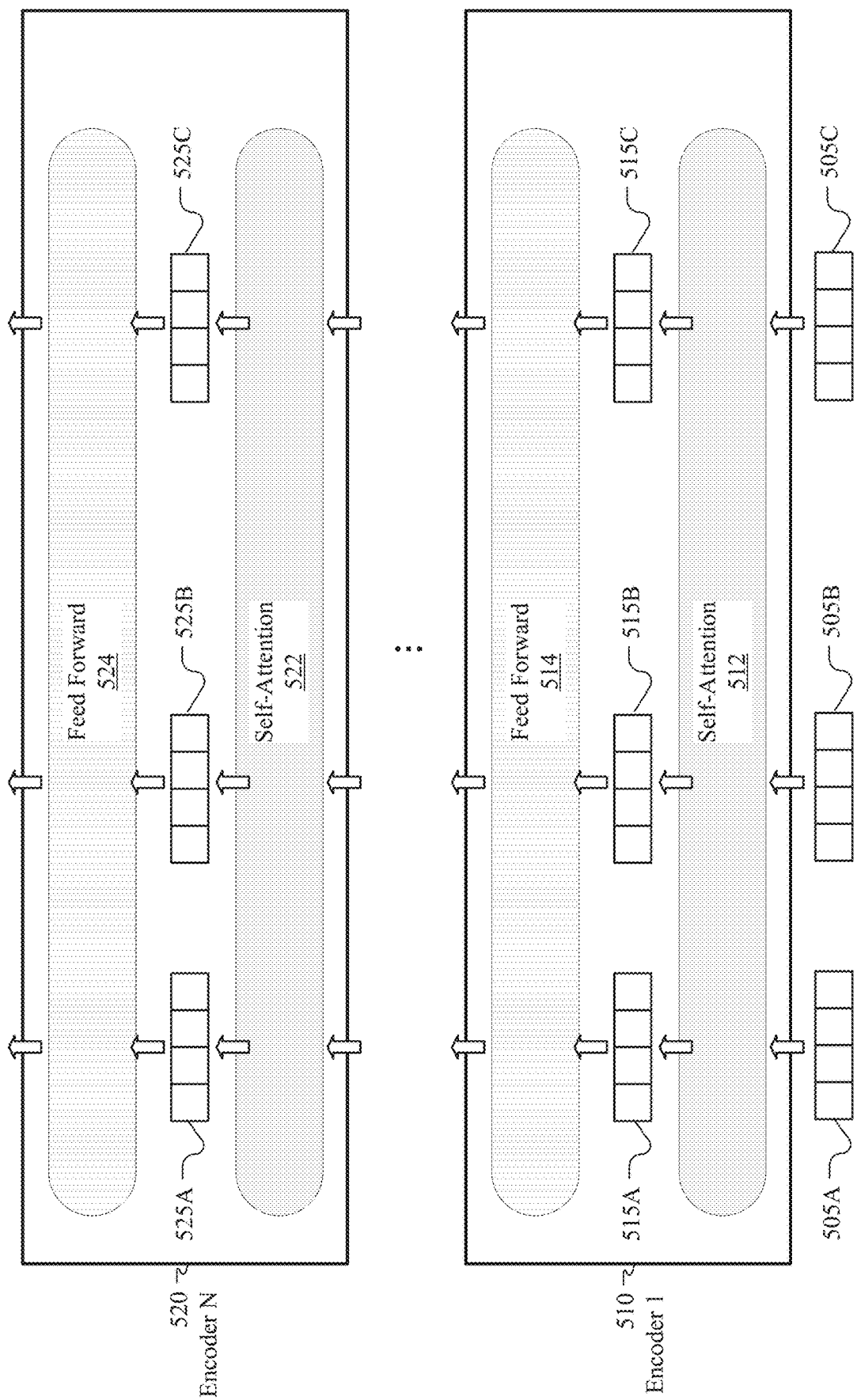
FIG. 5A illustrates an example encoding component of a Transformer architecture.

Another machine-learning architecture called Transformer architecture has been gaining popularity. The Transformer architecture has been widely used for language models, vision models, and any other suitable models. A typical Transformer architecture may comprise an encoding component and a decoding component. FIG. 5A illustrates an example encoding component of a Transformer architecture. The encoding component may comprise a plurality of encoders 510, 520. FIG. 5A illustrates only two encoders for simplicity, but a typical encoding component may comprise more encoders. The encoders may be identical in structure though the encoders may not share weights with each other. The first encoder 510 may be broken into two sub-layers: a self-attention layer 512 and a feed forward layer 514. Likewise, the Nth encoder 520 may comprise two sub-layers: a self-attention layer 522 and a feed forward layer 524. In the example illustrated in FIG. 5A, input embeddings 505A, 505B, and 505C may be processed by the self-attention layer 512 of the first encoder 510. All the encoders within the encoding component may take a list of embeddings of an identical size as input. The first encoder 510 of the encoding component may take the input embeddings 505A, 505B, and 505C as input while the other encoders of the encoding component may take output of a preceding encoder. The self-attention layer 512 of the first encoder 510 may produce output embeddings 515A, 515B, and 515C, which would be processed by the feed forward layer 514 of the first encoder 510. The output of the feed forward layer 514 may be provided to the self-attention layer of a second encoder (not shown in FIG. 5A) as input. As the encoding component illustrated in FIG. 5A comprises N encoders, the Nth encoder 520 may be the last encoder of the encoding component. The Nth encoder 520 may take output embeddings of an N−1st encoder as input. The self-attention layer 522 of the 520 may produce embeddings 525A, 525B, and 525C by processing the output embeddings of the N−1st encoder (not shown in FIG. 5A). The embeddings 525A, 525B, and 525C may be processed through the feed forward layer 524 of the Nth encoder 520. Output embeddings of the feed forward layer 524 may be provided to the decoding component of the Transformer architecture.

Figure 5B:
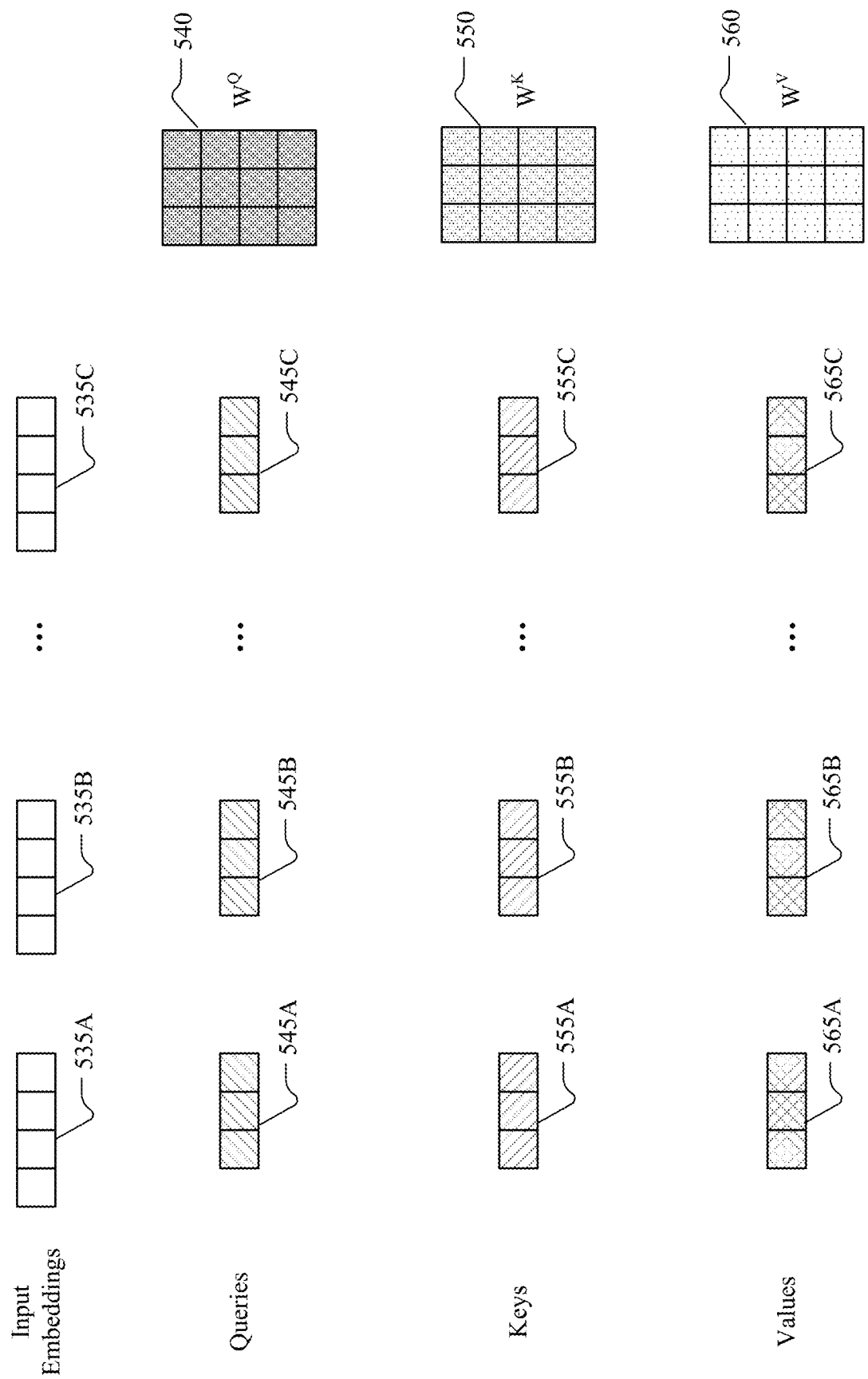
FIG. 5B illustrates an example processing for calculating embeddings from input embeddings at a self-attention layer.

FIG. 5B illustrates an example processing for calculating embeddings from input embeddings at a self-attention layer. Each self-attention layer may maintain three matrices: WQ 540, WK 550, and WV 560. A query embedding 545A corresponding to an input embedding 535A may be calculated by multiplying the input embedding 535A with WQ 540. A key embedding 555A corresponding to the input embedding 535A may be calculated by multiplying the input embedding 535A with WK 550. A value embedding 565A corresponding to the input embedding 535A may be calculated by multiplying the input embedding 535A with WV 560. Likewise, a query embedding 545B, a key embedding 555B, and a value embedding 565B corresponding to an input embedding 535B may be calculated by multiplying the input embedding 535B with WQ 540, WK 550, and WV 560, respectively. Also, a query embedding 545C, a key embedding 555C, and a value embedding 565C corresponding to an input embedding 535C may be calculated by multiplying the input embedding 535C with WQ 540, WK 550, and WV 560, respectively.

After calculating query embeddings 545A, 545B, and 545C, key embeddings 555A, 555B, and 555C, and value embeddings 565A, 565B, and 565C corresponding to input embeddings 535A, 535B, and 535C, the self-attention layer may calculate self-attention scores for all the possible pairs of input embeddings. A self-attention score $S_{i,j}$ between input embeddings i and j may be calculated as a dot product of query embedding Qi corresponding to the input embedding i and key embedding Kj corresponding to the input embedding j. A self-attention score $S_{i,j}$ may be converted into a softmax score $SM_{i,j}$ as $s_{i,j}/\Sigma_k s_{i,k}$. An output embedding Oi corresponding to input embedding i may be calculated as: $O_i = \Sigma_k SM_{i,k} \cdot V_k$. A value of the output embedding Oi may depend on the value of the query embedding Qi, values of key embeddings Kk, and values of value embeddings Vk for all k in {1, . . . , K}, where K is a number of input embeddings.

A mechanism called multi-headed self-attention may improve the performance of the self-attention layer. The multi-headed self-attention may give the self-attention layer multiple representation subspaces by introducing multiple sets of weight matrices: $W_m^Q$, $W_m^K$, and $W_m^V$ for all m in {1, . . . , M}, where M is a number of heads. For each input embedding, M different sets of query, key, and value embeddings may be calculated by multiplying the input embedding with each of M sets of weight matrices. A sub output embedding may be calculated using each set of query, key, and value embeddings. An output embedding of the multi-headed self-attention layer corresponding to an input embedding may be produced by concatenating the sub output embeddings corresponding to the input embedding and then multiplying with a weight matrix that is trained jointly with the multi-headed self-attention network.

Figure 5C:
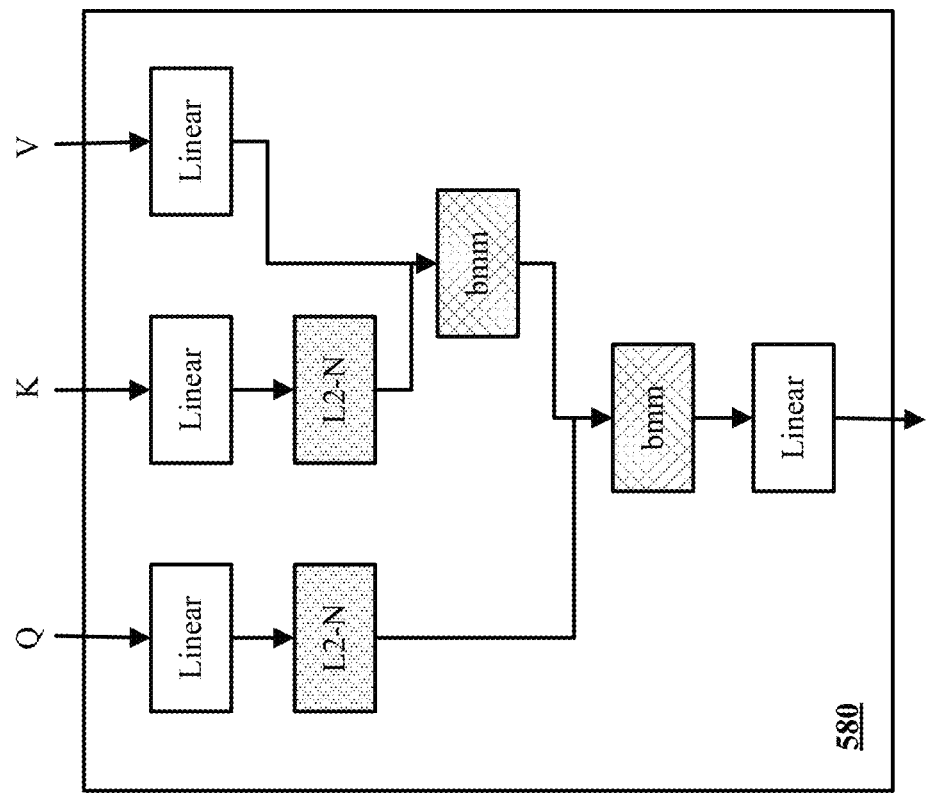
FIG. 5C illustrates two example flows for multi-headed self-attention computation.
Figure 5C:
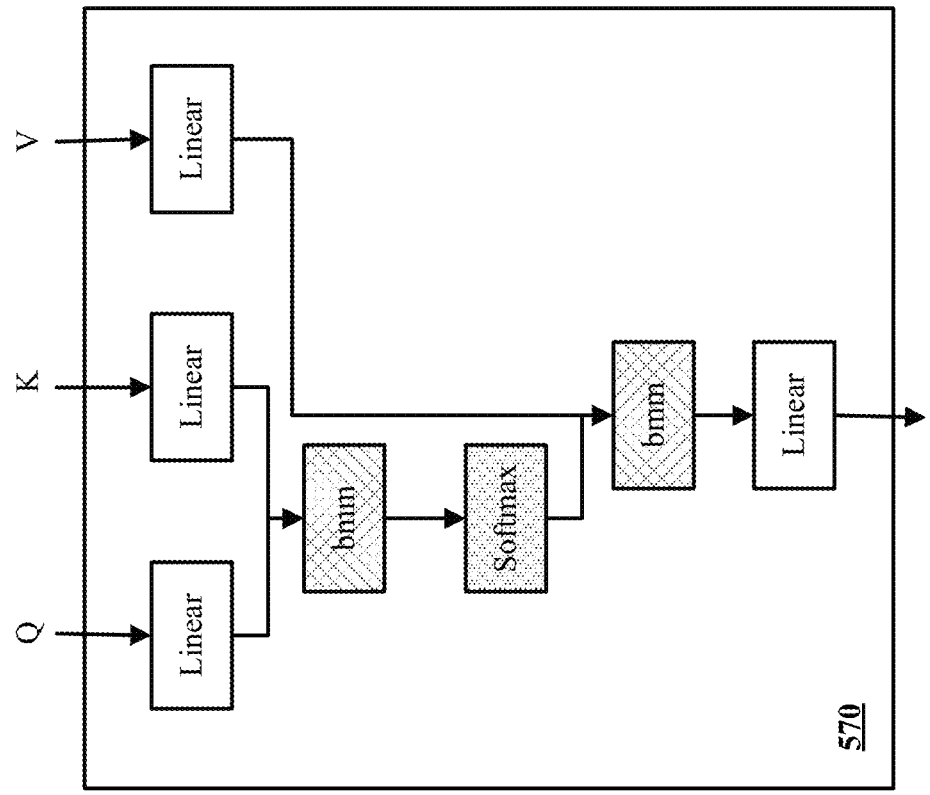

FIG. 5C illustrates two example flows for multi-headed self-attention computation. A first flow 570 represents a traditional multi-headed self-attention, while a second flow 580 shows an efficient variant called Fast Attention. Fast Attention implements the attention between query, key, and value embeddings in different orders. A first difference between a self-attention network and a CNN network may be that the self-attention network (for both traditional multi-headed self-attention and Fast Attention) comprises batch matrix-matrix product (bmm) operators that perform General Matrix Multiplication (GEMM) between two runtime-generated activation tensors, instead of between an activation tensor with off-line generated weight tensor. Another difference between the self-attention network and the CNN network may be that various normalization operators including softmax operators and layer normalization (L2-N) operators with runtime-generated scaling factors instead of batch normalizations with offline-generated scaling factors.

The ML accelerators described herein employ a multi-level control architecture designed to optimally exploit parallelism provided by tensor processor units in the ML accelerator. These machine learning accelerators may include one or more tensor processor clusters, each of which may include multiple tensor processor units. Each tensor processor unit may be a single-instruction-multiple-data (SIMD) machine that includes a compute array capable of performing vector operations to implement data parallelism or model parallelism at the tensor processor unit or tensor processor cluster level. Each tensor processor cluster may include a shared controller that controls and synchronizes the operations of the tensor processor units within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
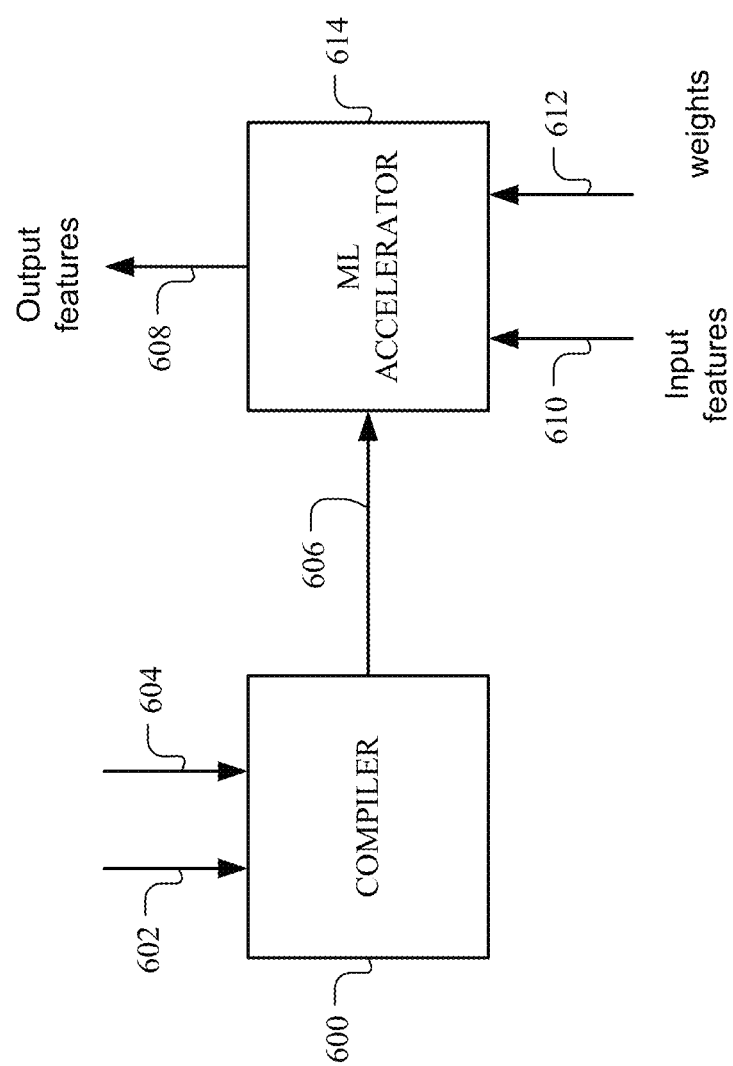
FIG. 6 illustrates selected elements of an example system including a compiler and an ML accelerator.

FIG. 6 illustrates selected elements of an example system including a compiler 600 and an ML accelerator 614. In the illustrated example, compiler 600 generates machine language instructions, shown as tensor instructions 606, based on inputs including programming language instructions 602 and configuration information 604 indicating the configuration of a neural network that is to perform the tensor instructions 606. In this example system, ML accelerator 614 receives the tensor instructions 606 and generates, for input features 610 and applicable weights 612, output features 608. For example, compiler 600 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear unit (NLU) instructions, and direct-memory access (DMA) instructions.

In particular embodiments, the compiler 600 may analyze a workload to be performed by the neural network and determine respective coarse-grained tensor instructions to be sent to each tensor processor cluster of ML accelerator 614 using a SIMD and/or single-program-multiple-data (SPMD) approach to distribute the workload. The compiler 600 may distribute the workload based on the architecture of the neural network, the number of tensor processor clusters, the number and processing capacity of the tensor processor units in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processor units, reduce the amount of data movement required between and within tensor processor clusters, and optimize resource utilization in ML accelerator 614.

In particular embodiments, the ML accelerator 614 may comprise a direct memory access (DMA) that is programmed with DMA instructions for iteratively transferring a plurality of non-contiguous blocks of data from a source memory to a destination memory through n-dimensional loops without being re-programmed. The DMA instructions may be programmed based on tensor instructions generated by a compiler 600. The DMA may be referred to as a smart DMA. The smart DMA may be used for instruction fetch and data transfer between the ML accelerator and external memories, as well within the ML accelerator 614. In particular embodiments, the smart DMAs may be used for fetching instructions to instruction master, fetching activation, weight, non-linear unit (NLU) parameters and look-up table (LUT) values to tensor processor clusters, Intra-cluster and inter-cluster activation halo transfers, FILL values to cluster activation memory, and transferring activations out to an external memory. As an example and not by way of limitation, the compiler 600 may generate coarse-grained tensor instructions for convolution operations. The coarse-grained tensor instructions may comprise parameters associated with an input tensor, parameters associated with an output tensor, and parameters associated with weight tensors. The DMA instructions for iteratively retrieving portions of the input tensor from an external memory to activation memory of tensor processor units may be generated based on the coarse-grained tensor instructions. The DMA instructions for iteratively retrieving weight tensors from the external memory to weight buffers of the tensor processor units may also be generated based on the coarse-grained tensor instructions. Although this disclosure describes a particular DMA that is programmed with DMA instructions for iteratively transferring a plurality of non-contiguous blocks of data from a source memory to a destination memory through n-dimensional loops without being re-programmed, this disclosure contemplates any suitable DMA that is programmed with DMA instructions for iteratively transferring a plurality of non-contiguous blocks of data from a source memory to a destination memory through n-dimensional loops without being re-programmed.

Figure 7A:
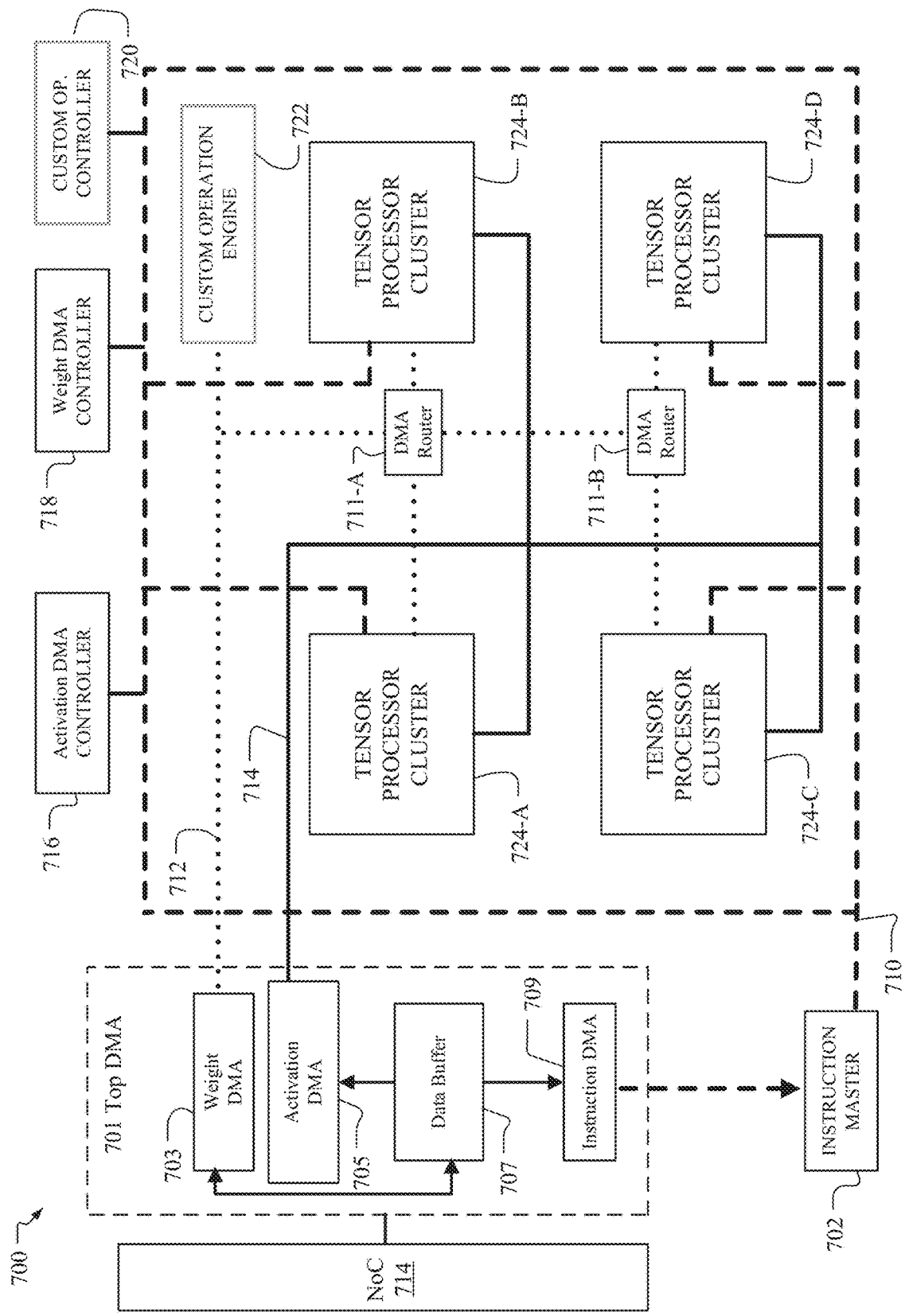
FIG. 7A illustrates selected elements of an example ML accelerator including multiple tensor processor clusters.

FIGS. 7A through 7E illustrate selected elements of an example ML accelerator, such as an ML accelerator similar to ML accelerator 614 illustrated in FIG. 6, at different levels of the multi-level accelerator architecture. For example, FIG. 7A illustrates that an example ML accelerator 700 may include four tensor processor clusters 724 and may include, or be communicably coupled to, one or more activation DMA controllers 716, a weight DMA controller 718, and/or an optional custom operation engine 722 and a corresponding optional custom operation controller 720. The ML accelerator 700 may include, or be communicably coupled to a top DMA 701, which may comprise a weight DMA agent 703, one or more activation DMA agents 705, a data buffer 707, and an instruction DMA agent 709. The top DMA 701 may be communicably coupled to one or more external memory over network on a chip (NoC) 714. The ML accelerator 700 may include, or be communicably coupled to, an instruction master 702, which may be communicably coupled to each of the four tensor processor clusters 724, the activation DMA controllers 716, the weight DMA controller 718, instruction DMA agent 709 over an instruction bus 710. The weight DMA 703, the activation DMA 705 and the instruction DMA 709 may additionally be communicably coupled to the data buffer 707. The weight DMA 703 may be communicably coupled to each of the four tensor processor clusters 724 (via DMA routers 711) and the optional custom operation engine 722 over weight DMA bus 712. The activation DMA 705 may be communicably coupled to each of the four tensor processor clusters 724 over activation DMA bus 714. In at least some embodiments, ML accelerator 700 may also include a synchronization bus (not shown in FIG. 7A) communicably coupled to the four tensor processor clusters 724, the activation DMA controller 716, the weight DMA controller 718, the optional custom operation engine 722 and corresponding optional custom operation controller 720, the instruction master 702, the weight DMA 703, the activation DMA 705, the instruction DMA 709, and/or the data buffer 707, or any suitable subset thereof.

To support multiple tensor processor clusters processing input features in parallel, weight DMA controller 718 may distribute neural network weights (e.g., in packets) to tensor processor clusters 724 via weight DMA bus 712. The network topology in which the weight DMA controller 718 is communicatively coupled to each of the tensor processor clusters 724 may allow each tensor processor within a tensor processor cluster 724 to be communicatively coupled to the weight DMA controller 718 via a respective sub-branch of the weight DMA bus 712. Similarly, one or more activation DMA controllers 716 may distribute activations to tensor processor clusters 724 via activation DMA bus 714. The network topology in which the activation DMA controller 716 is communicatively coupled to each of the tensor processor clusters 724 may allow each tensor processor within a tensor processor cluster 724 to be communicatively coupled to the activation DMA controller 716 via a respective sub-branch of the activation DMA bus 714. By structuring the weight DMA bus 718 and the activation DMA bus 716 according to a tree network topology (e.g., rather than a star or ring topology), the corresponding DMA controllers 718 and 716 may distribute neural network weights and activations to each tensor processor cluster 724 directly, thereby minimizing latency and overall power consumption. As such, the machine learning accelerator 700 may be suitable for AR/VR applications or other applications that require feature processing with minimal latency within a finite power budget.

Figure 7B:
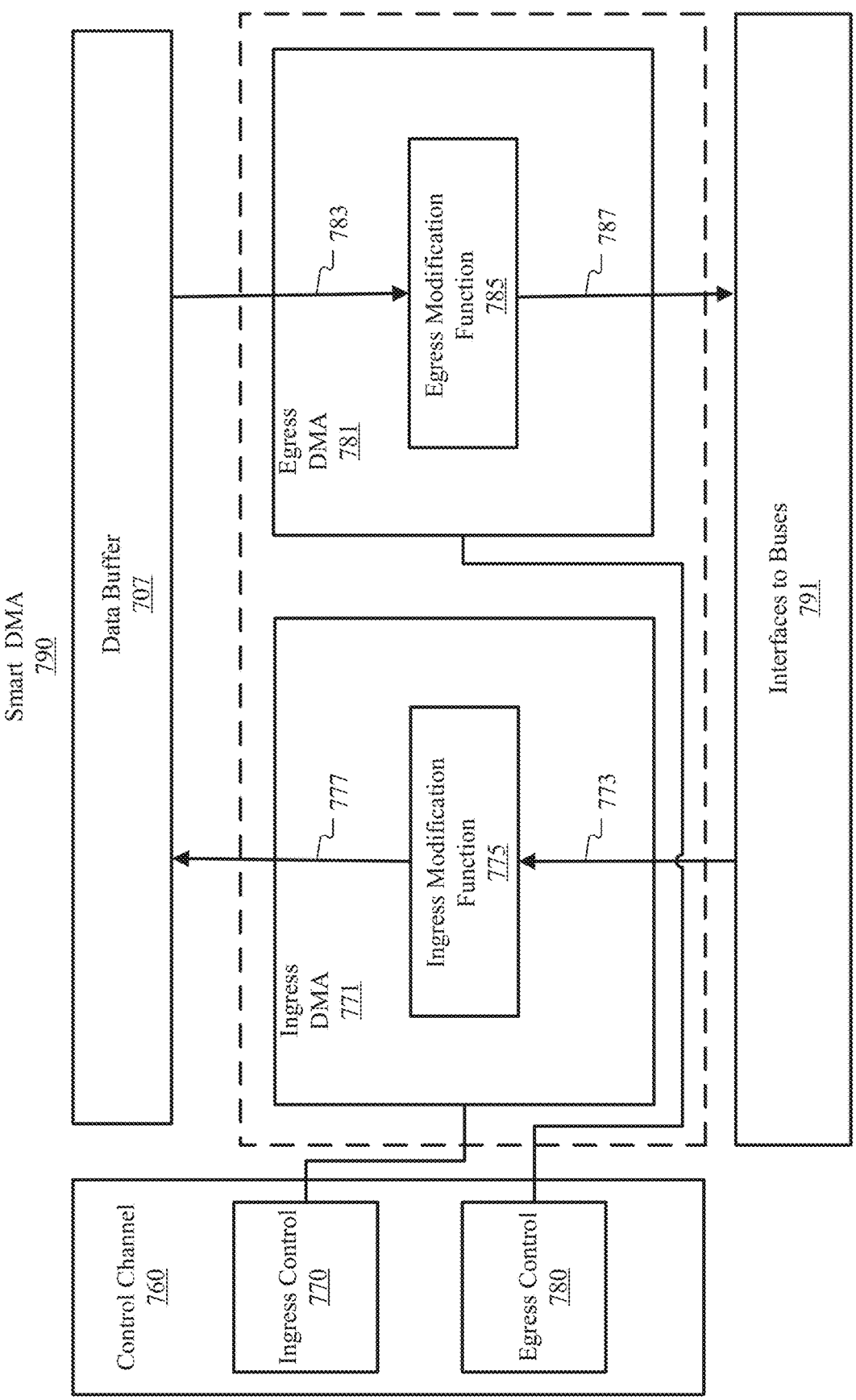
FIG. 7B illustrates selected logical elements of a smart DMA within an ML accelerator.

In particular embodiments, a smart DMA may comprise an ingress component that reads data from a source memory and writes the data to a data buffer and an egress component that reads data from the data buffer and writes the data to a destination memory. Each of the ingress component and the egress component of the smart DMA may run on a thread that is independent from each other. An n-dimensional loops executed on the ingress component thread may be independent from an n-dimensional loops executed on the egress component thread. In particular embodiments, the ingress component and the egress component of the smart DMA may be synchronized via synchronization tokens. FIG. 7B illustrates selected logical elements of a smart DMA within an ML accelerator. The smart DMA 790 illustrated in FIG. 7B may be an instance of a weight DMA 703, an activation DMA 705, or any suitable instance of smart DMA. As an example and not by way of limitation, a smart DMA 790 may comprise an ingress component and an egress component. The ingress component may comprise an ingress control 770 and an ingress DMA 771. The egress component may comprise an egress control 780 and an egress DMA 781. One or more control channels 760 may be associated with each smart DMA 790. A control channel 760 may comprise an ingress control 770 that may generate DMA instructions for the ingress DMA 771 at each iteration of n-dimensional loops executed by the ingress DMA 771 and an egress control 780 that may generate DMA instructions for the egress DMA 781 at each iteration of n-dimensional loops executed by the egress DMA 781. The smart DMA 790 may be communicably coupled to a data buffer 707. In particular embodiments, the data buffer 707 may be a part of the smart DMA 790. The smart DMA 790 may be communicably coupled to interfaces to buses 791 that may be communicable coupled to memories. Although this disclosure describes an ingress component and an egress component of a smart DMA in a particular manner, this disclosure contemplates an ingress component and an egress component of a smart DMA in any suitable manner.

In particular embodiments, the ingress component may be configured to read a first block of data from a first address of the source memory, process the first block of data with an ingress modification function, and store the first block of data to a second address of a data buffer at an iteration of a loop among the n-dimensional loops. The DMA instructions associated with the iteration of the loop may comprise information associated with the first address of the source memory, information associated with a size of the first block of data, information associated with the ingress modification function. The information associated with the first address of the source memory may comprise a base source address and a source address increment value for each dimension of the n-dimensional loops. The ingress modification function may perform zero or more first modifications to the first block of data based on the information associated with the ingress modification function. The zero or more first modifications may comprise a data decompression, or a data realignment. As an example and not by way of limitation, continuing with a prior example illustrated in FIG. 7B, the ingress control 770 may generate, at each iteration of n-dimensional loops, DMA requests with a source address indicating a location in a source memory, a target address indicating a location at the data buffer 707, a data block size, and parameters associated with the ingress modification function 775 to be performed on the data block based on DMA instructions. The ingress control 770 may send the generated DMA requests including source address, target address, data block size, and parameters associated with the ingress modification function 775 to the ingress DMA 771. The ingress DMA 771 may read a data block of the generated data block size from the location in the source memory indicated by the source address through an interface 791 to a bus communicably coupled with the source memory at step 773. In particular embodiments, each block read request may be chopped into a linear sequence of burst read transactions that would be sent to the interface 791. When the data block returns from the interface 791, The ingress DMA 771 may perform the ingress modification function 775 on the retrieved data block based on the parameters received from the ingress control 770. In particular embodiments, the ingress modification function 775 may perform zero modification. In particular embodiments, the ingress modification function 775 may perform a data decompression on the retrieved data block. In particular embodiments, the ingress modification function 775 may perform a data realignment on the retrieved data block. In particular embodiments, the ingress modification function 775 may perform a data decompression and a data realignment on the retrieved data block. At step 777, the ingress DMA 771 may write the data block that is processed by the ingress modification function 775 to a location at the data buffer 707 indicated by the target address. Although this disclosure describes transferring a block of data from a source address indicating a location in a source memory to a target address indicating a location at a data buffer at an iteration of n-dimensional loops in a particular manner, this disclosure contemplates transferring a block of data from a source address indicating a location in a source memory to a target address indicating a location at a data buffer at an iteration of n-dimensional loops in any suitable manner.

In particular embodiments, the egress component may be configured to read a second block of data from a third address of the data buffer, process the second block of data with an egress modification function, and store the second block to a fourth address of the destination memory at an iteration of the loop among the n-dimensional loops. The DMA instructions associated with the iteration of the loop may comprise information associated with the egress modification function, and information associated with the fourth address of the destination memory. The information associated with the fourth address of the destination memory may comprise a base destination address and a destination address increment value for each dimension of the n-dimensional loops. The egress modification function may perform zero or more second modifications to the second block of data based on the information associated with the egress modification function. The zero or more second modifications may comprise a data realignment, a conversion of RGB codes to RGB0 codes, or a tensor transpose. As an example and not by way of limitation, continuing with a prior example illustrated in FIG. 7B, the egress control 780 may generate, at each iteration of n-dimensional loops, DMA requests with a source address indicating a location at the data buffer 707, a destination address indicating a location in a destination memory, a data block size, and parameters associated with the egress modification function 785 to be performed on the data block based on DMA instructions. The egress control 780 may send the DMA requests with the generated source address, destination address, data block size, and parameters associated with the egress modification function 785 to the egress DMA 781. The egress DMA 781 may read a data block of the generated data block size from a location at the data buffer 707 indicated by the source address at step 783. In particular embodiments, each block read request may be chopped into linear single-beat read transactions and sent to the data buffer 707. The egress DMA 781 may perform the egress modification function 785 on the retrieved data block based on the parameters received from the egress control 780. In particular embodiments, the egress modification function 785 may perform zero modification. In particular embodiments, the egress modification function 785 may perform a data realignment on the retrieved data block. In particular embodiments, the egress modification function 785 may perform a conversion of RGB codes to RGB0 codes on the retrieved data block. In particular embodiments, the egress modification function 785 may perform a tensor transpose on the retrieved data block. In particular embodiments, the egress modification function 785 may perform any possible combination of a data realignment, a conversion of RGB codes to RGB0 codes, and a tensor transpose on the retrieved data block. At step 787, the egress DMA 781 may write the data block that is processed by the egress modification function 785 to a location in the destination memory indicated by the destination address through an interface 791 to a bus communicably coupled with the destination memory. In particular embodiments, egress component may optionally be configured to write back to the data buffer 707 as a destination memory. Although this disclosure describes transferring a block of data from a source address indicating a location at a data buffer to a destination address indicating a location at a destination memory at an iteration of n-dimensional loops in a particular manner, this disclosure contemplates transferring a block of data from a source address indicating a location at a data buffer to a destination address indicating a location at a destination memory at an iteration of n-dimensional loops in any suitable manner.

In particular embodiments, the ingress component may be further configured to send a token to the egress component to indicate that the first block of data is available in the data buffer. The egress component may be further configured to determine that the second block of data is available at the data buffer based at least on a token sent by the ingress component indicating that the second block of data is available at the third address of the data buffer before the egress component reads the second block of data. As an example and not by way of limitation, continuing with a prior example illustrated in FIG. 7B, the ingress control 770 may send a token indicating that a data block is available at the data buffer 707 to the egress control 780. Upon receiving the token from the ingress control 770, the egress control 780 may determine that the data block is available at the data buffer 707. The egress control 780 may generate instructions for transferring this data block from the data buffer 707 to a destination memory at a following iteration and send the generated instructions to the egress DMA 781. The egress DMA 781 may retrieve the data block from the data buffer 707, run an egress modification function 785 on the retrieved data block, and write the data block to the destination memory based on the instructions received from the egress control 780. Although this disclosure describes a token transmission from the ingress component to the egress component to indicate that a data block is available at the data buffer in a particular manner, this disclosure contemplates a token transmission from the ingress component to the egress component to indicate that a data block is available at the data buffer in any suitable manner.

In particular embodiments, the egress component may be further configured to send a first token to a data consuming thread of the second block of data to inform that the second block of data is available. In particular embodiments, the first token may be a special packet following the second block of data. The egress component may also be configured to send a second token to the ingress component to inform that the second block of data is transferred from the data buffer. The ingress component may be configured to determine whether the data buffer has enough space to store the first block of data based at least on a token from the egress component indicating a block of data is transferred from the data buffer. As an example and not by way of limitation, when the egress DMA 781 associated with an activation DMA 705 transfers a block of data to an activation memory of a tensor processor cluster 724, the egress DMA 781 may send a special packet following the block of data to inform a data consuming thread that the data block is available at the activation memory. The data consuming thread may determine that the block of data is available at the activation memory based on the special packet. The data consuming thread may send a token through the synch bus after moving the data block from the destination address. Although this disclosure describes a token transmission from the egress component to a data consuming thread in a particular manner, this disclosure contemplates a token transmission from the egress component to a data consuming thread in any suitable manner.

In particular embodiments, the egress control 780 may also send a token to the ingress control 770 indicating that the data block is transferred. Upon receiving the token from the egress control 780, the ingress control 770 may determine that the address space used to store the data block at the data buffer 707 becomes available for another data block. Although this disclosure describes a token transmission from the egress component to the ingress component in a particular manner, this disclosure contemplates a token transmission from the egress component to the ingress component in any suitable manner.

Figure 7C:
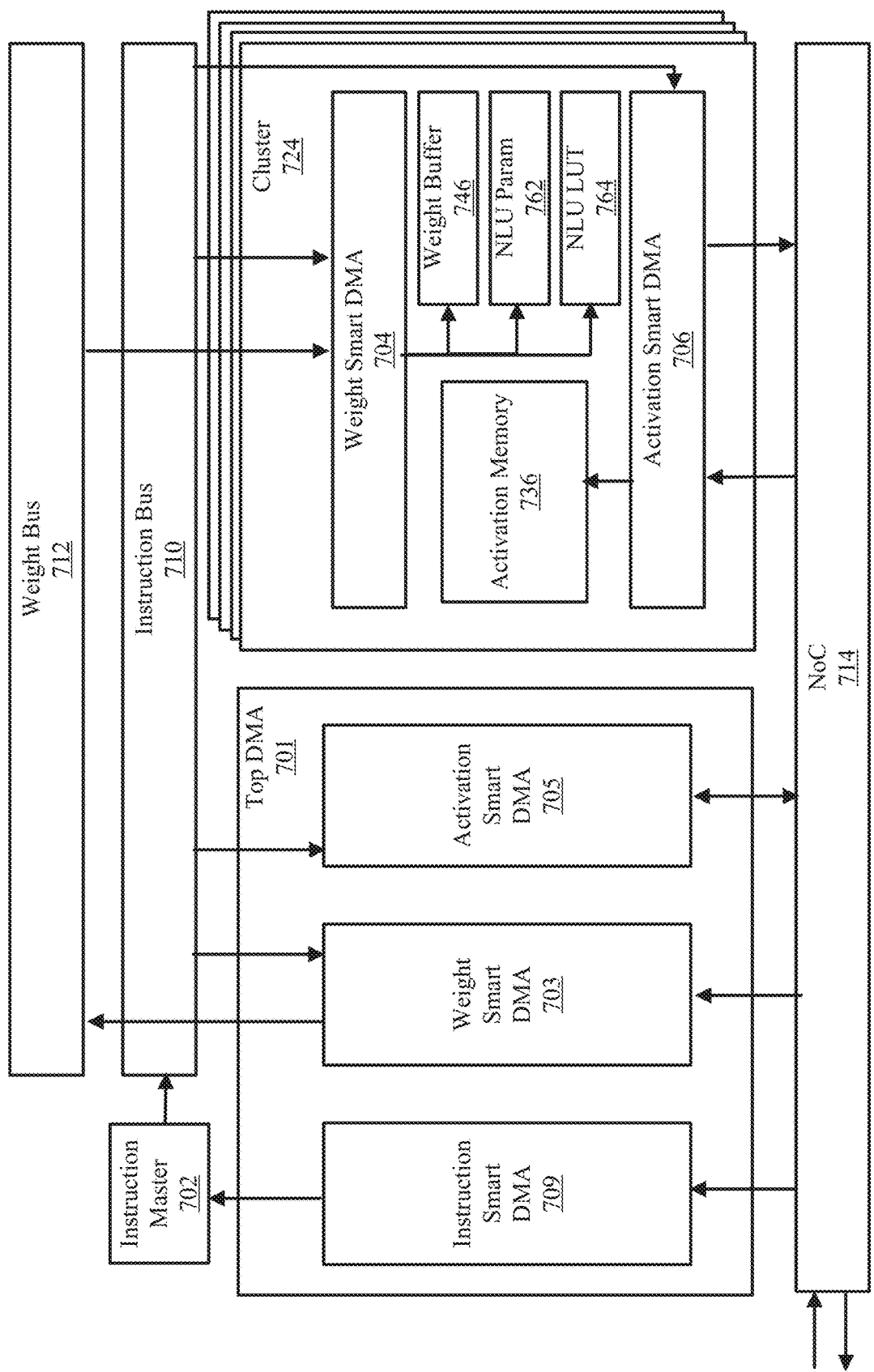
FIG. 7C illustrates example connectivity of smart DMAs within an ML accelerator.

FIG. 7C illustrates example connectivity of smart DMAs within an ML accelerator. The smart DMAs may be communicably coupled to a plurality of buses. The buses may include NoC 714 that connects external memory and cluster activation memories 736, weight bus 712 that connects weight Smart DMA 703 to cluster weight buffer 746, NLU param 762 and NLU LUT 764, instruction bus 710 that connects instruction master 702 to all control agents in the ML accelerator 700, and synch bus (not shown) that connects sync master and all control agents in the ML accelerator 700.

In particular embodiments, the smart DMA may be an activation smart DMA 705 that transfers activations from an external memory to cluster activation memories 736 though NoC 714. In particular embodiments, the activation smart DMA 705 may also be used for halo transfers, fill to activation memory, and transferring activation output to the external memory. The activation smart DMA may comprise k control channels, wherein k is a number of tensor processor clusters in the ML accelerator 700. The ingress modification function 775 for the activation smart DMA 705 may support the data realignment. The egress modification function 785 for the activation smart DMA 705 may support the conversion of RGB codes to RGB0 codes. Although this disclosure describes a particular activation smart DMA, this disclosure contemplates any suitable activation smart DMA.

In particular embodiments, the smart DMA may be a weight smart DMA 703 that transfers weights, non-linear unit parameters, or look-up table values from an external memory to one or more clusters through weight bus 712. The ingress modification function 775 for the weight smart DMA 703 may support the data decompression and the data realignment. The egress modification function 785 for the weight smart DMA 703 may support the data realignment, the tensor transpose and shuffle. Although this disclosure describes a particular weight smart DMA, this disclosure contemplates any suitable weight smart DMA.

In particular embodiments, the smart DMA may be an instruction smart DMA 709 that may be used for fetching instructions from an external memory to the instruction master 702. The instruction smart DMA 709 may comprise only ingress component that reads instructions from the external memory and writes the instructions to the instruction master 702. Although this disclosure describes a particular instruction smart DMA, this disclosure contemplates any suitable instruction smart DMA.

In particular embodiments, the smart DMA may be a cluster activation smart DMA 706 that may be used for intra-cluster and inter-cluster halo transfers and fills, as well as transferring activation output to an external memory. Each tensor processor cluster may have one cluster activation smart DMA 706. The cluster activation smart DMA 706 may comprise only egress component. The cluster activation smart DMA 706 may regard the activation memory 736 in the same tensor processor cluster as local activation memory while the cluster activation smart DMA 706 may regard the activation memory 736 in different tensor processor cluster as remote activation memory. Thus, the local activation memory may be treated as a data buffer and the remote activation memory may be treated as a destination memory. The cluster activation smart DMA 706 may also support local forwarding in which data is written to a location activation memory. Each cluster activation smart DMA 706 may be associated with a single control channel. The egress modification function 785 for the cluster activation smart DMA 706 may support a tensor transpose and the data realignment. Although this disclosure describes a particular cluster activation smart DMA, this disclosure contemplates any suitable cluster activation smart DMA.

Figure 7D:
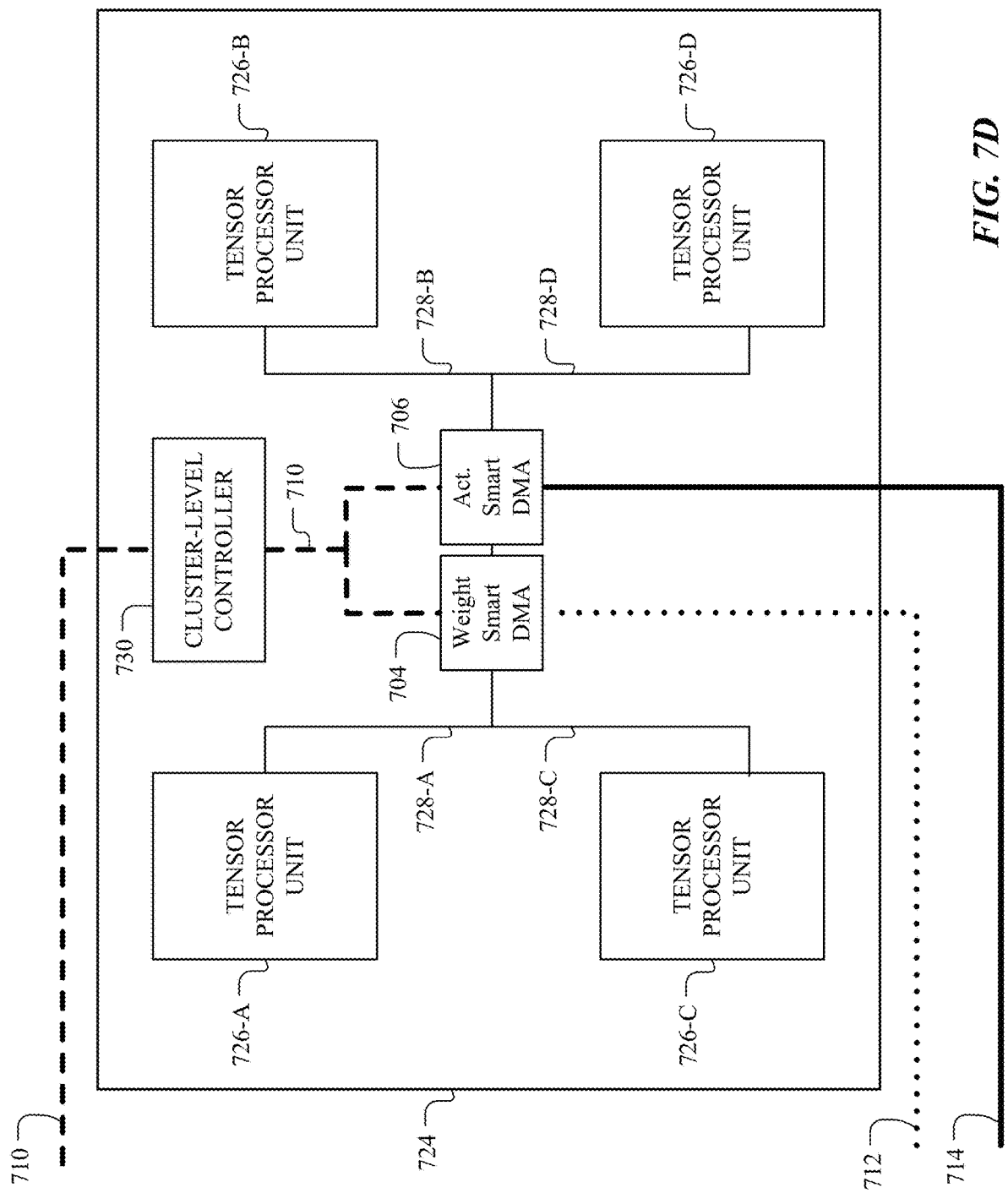
FIG. 7D illustrates selected elements of an example tensor processor cluster.

FIG. 7D illustrates selected elements of an example tensor processor cluster, such as one of the four tensor processor clusters 724 of ML accelerator 700 illustrated in FIG. 7A. In this example, tensor processor cluster 724 includes four tensor processor units 726-A through D, a shared cluster-level controller with synchronizer 730, a cluster weight smart DMA 704, a cluster activation smart DMA 706, and four DMA bus sub-branches 728-A through D communicably coupling tensor processor units 726 to weight DMA bus 712 and activation DMA bus 714.

In one embodiment, cluster-level controller 730 may comprise a system, device, or apparatus generally operable to interpret coarse-grained tensor instructions received from a compiler, such as compiler 600 illustrated in FIG. 6, and translate it into a series of fine-grained tensor instructions that may be sent to tensor processor units 726 in tensor processor cluster 724 tasked with performing a common series of operations. Each of these fine-grained tensor instructions may include neural network operations (e.g., convolution, bias-add, normalization, pooling, and the like) to be performed by hardware compute arrays within each tensor processor unit 726 or may represent a non-linear instruction to be applied to an intermediate output of the hardware compute arrays to produce an element of an output feature. In addition, cluster-level controller 730 may include synchronizers that synchronize the operations of the tensor processor units 726 within tensor processor cluster 724 so that they may perform the common series of operations in parallel and in lockstep. In particular, cluster-level controller 730 may use the synchronizers to generate a token indicating that tensor processor units 726 have completed the common series of operations and that the tensor data was processed. In one embodiment, cluster-level controller 730 may send the token to activation DMA controller 716 such that activation DMA controller 716 may instruct cluster activation smart DMA 706 to retrieve additional tensor data from data buffer 707 to distribute to tensor processor units 726 for further processing in lockstep. Cluster-level controller 730 may ensure that the appropriate subsets of the tensor data and the set of weights to be applied for each operation have been loaded into the local memory of each tensor processor unit 726 tasked with performing the common series of operations. In one embodiment, this may include generating an address pattern for the weights and/or generating an address pattern for the outputs of the common series of operations.

In the example illustrated in FIG. 7D, cluster-level controller 730 receives tensor instructions (e.g., coarse-grained tensor instructions) over instruction bus 710. Each coarse-grained tensor instruction sent to a tensor processor cluster 724 may encode information usable by the tensor processor cluster 724 to perform a multi-cycle operation corresponding to a part of a single neural network layer. In one example, using a single-program-multiple-data (SPMD) approach, compiler 600 (illustrated in FIG. 6) may distribute a workload such that different tasks are assigned to different tensor processor clusters 724 with some or all of the tensor processor clusters 724 operating on the same tensor data. In another example, using a single-instruction-multiple-data (SIMD) approach, compiler 600 may distribute the workload such that the same tasks are assigned to multiple tensor processor clusters 724 and such that each of those multiple tensor processor clusters 724 operates on different tensor data, such as on a different subset of an input feature for the neural network. Using this approach, the tensor processor clusters 724 may operate in parallel and may typically, but not necessarily, operate in lockstep with one another.

In particular embodiments, the cluster activation smart DMA 706 and the cluster weight smart DMA 704 may be communicably coupled to an activation DMA 705 and a weight DMA 703, such as those illustrated in FIG. 7A, over activation DMA bus 714 and weight DMA bus 712, respectively, to provide the appropriate weights and input features to each tensor processor unit 726 in each cycle. In the example tensor processor cluster 724, each of the four tensor processor units 726A-D may operate on one-quarter of the input features allocated to tensor processor cluster 724 by the compiler, as provided by the cluster activation smart DMA 706. In particular embodiments, the cluster activation smart DMA 706 and the synchronizers within cluster-level controller 730 may make it possible to share edge pixels between layers. For example, the cluster activation smart DMA 706 may be coupled with the synchronizers to help move output edge pixels from the activation memories of particular tensor processor units 726 to the activation memories of other tensor processor units 726 for computing the next layer output. In some cases, such as when the dimensions of the output feature map are different than the dimensions of the input feature map for the next layer, each tensor processor unit 726 may require output features generated by more than one tensor processor unit 726 as input features for computing the next layer output. In particular embodiments, the synchronizers may schedule DMA operations to move the data based on information encoded in the multi-cycle instructions by the compiler and received by cluster-level controller 730.

Because the tensor processors within a given tensor processor cluster operate in parallel and lock step to perform the same sequence of vector operations in accordance with a common recipe, each tensor processor may be configured to perform the same amount of work. However, the amount of work to be done, collectively, by the tensor processor units might not be divisible across the tensor processor units in a way that utilizes all of the available computing resources in the tensor processor units. In particular embodiments, the compiler may "round up" the amount of work allocated to each tensor processor cluster to match the number and dimensions of the tensor processor units and MAC computation units thereof, such as by zero padding the spatial partition of the input feature map provided to the cluster to maintain symmetry between the tensor processor units. The zero padding may be applied by the compiler at different levels of the multi-level control architecture, in different embodiments. In one example, if a given cluster is to compute a 3×3 output tensor and the cluster includes four tensor processor units, the compiler may apply zero padding to the respective spatial partition of the input tensor assigned to the cluster in the x and y dimensions such that the computation generates a 4×4 output tensor that is divisible across the four tensor processor units, portions of which may be discarded or ignored. In another example, zero padding may be applied at a lower level of the multi-level control architecture. For example, a particular tensor processor unit may be configured to generate outputs in 32 channels, but the convolution operation to be performed by the tensor processor unit may produce an output tensor having only 30 channels. In this example, the compiler may apply zero padding to expand the dimensions of the computation to match the dimensions of the output tensor.

Figure 7E:
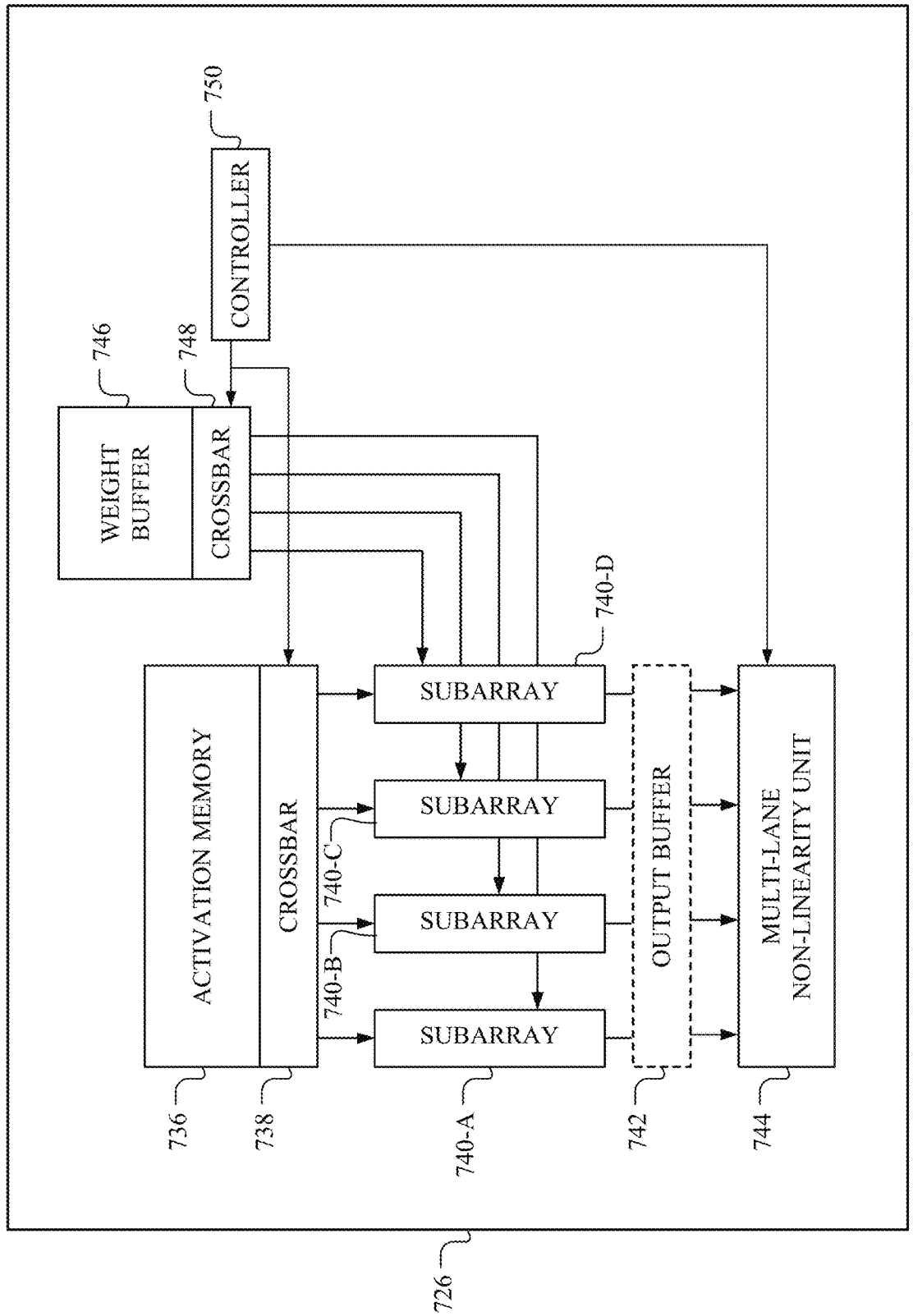
FIG. 7E illustrates selected elements of an example tensor processor unit.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processor units described in this application address this problem using flexible hardware resources and flexible computation-to-hardware mapping. For example, FIG. 7E illustrates selected elements of an example tensor processor unit 726, such as one of the four tensor processor units 726 of tensor processor cluster 724 illustrated in FIG. 7D. In particular embodiments, tensor processor unit 726 is implemented with a flexible architecture in which computation components are organized such that the tensor processor unit 726 can support a variety of convolutional layer shapes with high resource utilization and high reuse of locally available data. The tensor processor unit 726 may be a SIMD machine that includes a compute array capable of performing vector operations that collectively implement higher-level tensor instructions using data parallelism or model parallelism in a neural network. In the example illustrated in FIG. 7E, tensor processor unit 726 includes an activation memory 736, a first crossbar 738, four compute subarrays 740, an optional output buffer 742, a multi-lane non-linearity unit 744, a weight buffer 746, e.g., a register file storing weights, a second crossbar 748, and a local controller 750. In particular embodiments, tensor processor unit 726 may, during operation, be dynamically configured to perform convolution operations of different sizes and shapes by controlling the size and shape of the input feature map data and weights supplied to each of the subarrays 740 and MAC computation units thereof using the flexible crossbars 738 and 748 and by controlling the reduction and/or combination of the outputs of each of the subarrays 740 and MAC computation units thereof to generate an output feature map of a desired size and shape. In particular embodiments, tensor processor unit 726 may also be configured to perform group convolution operations in which not all output elements depend on the same input elements or weights.

In the illustrated example, activation memory 736 includes local memory elements that store tensor data (e.g., input feature map elements) to be provided to various ones of the subarrays 740. The first crossbar 738 is a first flexible many-to-many crossbar that reads tensor data (e.g., pixel values) from activation memory 736 and provides them to the appropriate subarrays 740 in each cycle. In the illustrated example, weight buffer 746, which may be implemented as a register file, includes local memory elements that store the filter weights to be provided to various ones of the subarrays 740. The second crossbar 748 is another flexible crossbar that loads filter weights from weight buffer 746 and provides them to the appropriate subarrays 740 in each cycle.

In particular embodiments, each of the four compute subarrays 740 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 750 within tensor processor unit 726 may, e.g., in conjunction with a shared cluster-level controller, such as shared cluster-level controller 730 illustrated in FIG. 7D, control the operation of the crossbars 738 and 748 and the flexible reduction module or multi-lane non-linearity unit 744, in accordance with the coarse-grained tensor instructions received from compiler 600 illustrated in FIG. 6 and/or fine-grained instructions received from the shared cluster-level controller 730.

In particular embodiments, the optional output buffer 742 stores intermediate outputs from one or more subarrays 740 such that partial results may be accumulated prior to passing them through a reduction module, thus reducing the scope and/or complexity of the reduction operation. In particular embodiment, the multi-lane non-linearity unit 744 is a flexible reduction module configurable to take an intermediate computation output from the subarrays 740 and perform a reduction (i.e., addition) of subarray outputs to produce an output for tensor processor unit 726 as a whole, where appropriate.

Figure 8:
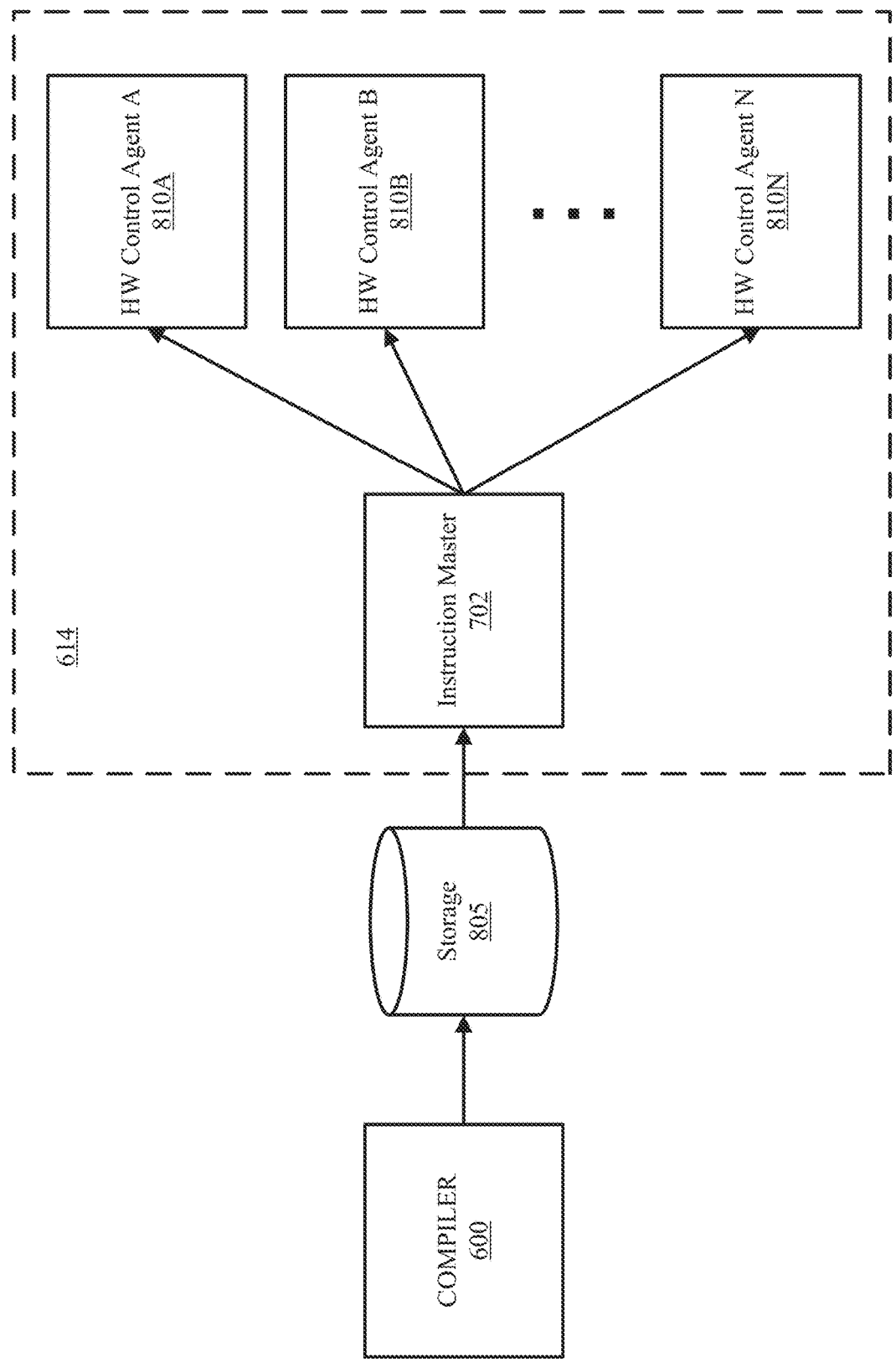
FIG. 8 illustrates an example architecture for distributing instructions for a machine-learning accelerator.

In particular embodiments, a computing system for accelerating machine-learning computations may comprise one or more control agents and an instruction master. The computing system may be referred to as a machine-learning accelerator. The one or more control agents may be hardware control agents. In particular embodiments, the one or more control agents may comprise DMA control agents, COMP control agents, NLU control agents, or any suitable hardware control agents in the machine-learning accelerator. FIG. 8 illustrates an example architecture for distributing instructions for a machine-learning accelerator. A compiler 600 associated with a machine-learning accelerator 614 may generate instructions that are to be executed by one or more hardware control agents 810A, 810B, . . . , 810N based on inputs including programming language instructions and configuration information associated with the machine-learning accelerator. The generated instructions may be stored in a data storage 805. An instruction master 702 at the machine-learning accelerator 614 may fetch an instruction for one of the one or more hardware control agents 810A, 810B, . . . , 810N from the data storage 805. The instruction master 702 may send the fetched instruction to the one of the one or more hardware control agents 810A, 810B, . . . , 810N so that the one hardware control agent executes the instruction. The instruction may be a tensor instruction. The tensor instruction may be considerably long. A long tensor instruction may consume the storage space as well as the bandwidth for carrying the tensor instruction from the compiler 600 to the data storage 805, from the data storage 805 to the instruction master 702, and from the instruction master 702 to the control agents 810A, 810B, . . . , 810N. The tensor instructions may include considerable number of consecutive zero symbols because a tensor instruction may comprise one or more fields that are not used for the tensor instruction. Also, consecutive two tensor instructions belonging to a single control agent may have similar symbol streams. Because of such characteristics of the tensor instructions, a size of a tensor instruction may be significantly reduced when the tensor instruction is compressed. The reduced size of the tensor instruction may save the storage space and the bandwidth required to transmit the tensor instruction. Although this disclosure describes a particular architecture for distributing instructions for a machine-learning accelerator, this disclosure contemplates any suitable architecture for distributing instructions for a machine-learning accelerator.

In particular embodiments, a compiler 600 associated with the machine-learning accelerator 614 may generate, encode, and compress an instruction that are to be executed by one of the one or more control agent 810. The compiler 600 may generate the instruction based on inputs including programming language instructions and configuration information associated with the machine-learning accelerator 614. The compiler 600 may perform a temporal-delta encoding on a later instruction among two consecutive instructions that are to be performed by a single control agent. The temporal-delta encoding may comprise performing bitwise exclusive OR operations between the two consecutive instructions. Followings are pseudo codes for the temporal-delta encoding on a later instruction among two consecutive instructions, a previous_instruction and a current instruction:

```
for (int i = 0; i < N; i++) {
    bitA = previous_instruction[i];
    bitB = current_instruction[i];
    bitXOR = bitA ^ bitB;
    Output[i] = bitXOR;
}
```

Figure 9A:
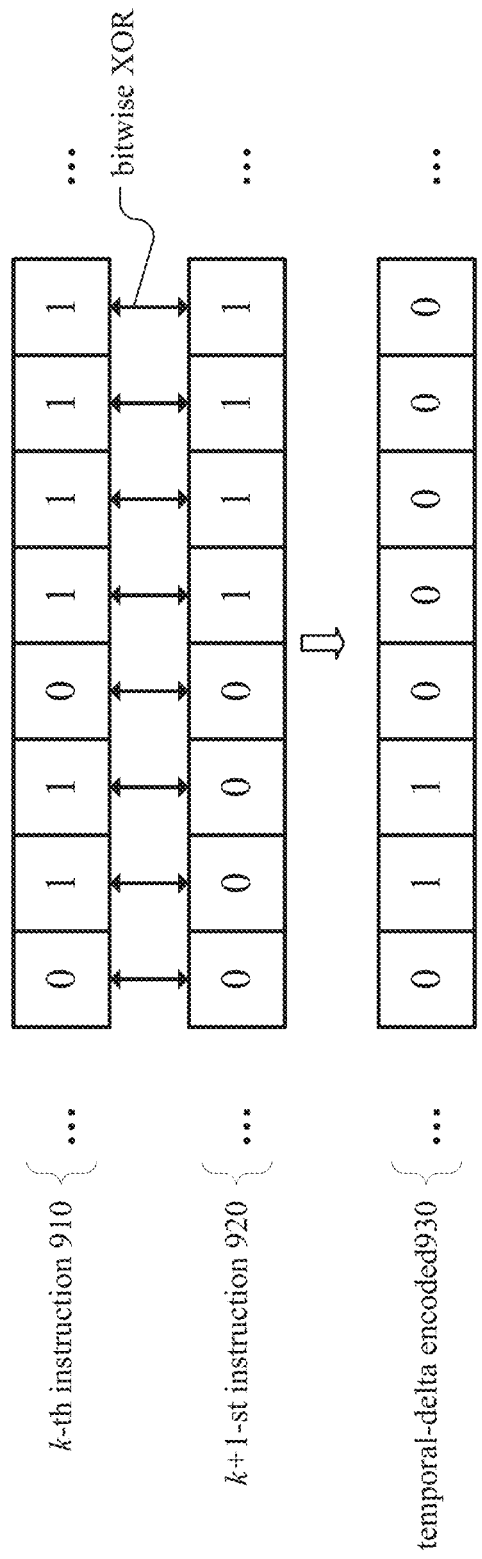
FIG. 9A illustrates an example temporal-delta encoding on a later instruction among two consecutive instructions that are to be executed by a control agent.

FIG. 9A illustrates an example temporal-delta encoding on a later instruction among two consecutive instructions that are to be executed by a control agent. As an example and not by way of limitation, illustrated in FIG. 9A, $k^{th}$ instruction 910 and $k+1^{st}$ instruction 920 are to be executed by a hardware control agent 810. As both of the instructions are executed in a sequence, the instructions 910 and 920 may access similar address ranges. Also, the instructions 910 and 920 may correspond to similar operations, in which operation codes are similar to each other. The compiler 600 may perform temporal-delta encoding on the $k+1^{st}$ instruction 920 by performing a bitwise XOR operation on every bit in the $k+1^{st}$ instruction 920 with a corresponding bit in the $k^{th}$ instruction 910. An output of a bitwise XOR operation is zero when two input bits are identical to each other. The output of a bitwise XOR operation is one when the two input bits are different from each other. Thus, the output temporal-encoded instruction 930 may have a greater number of zeros when the $k^{th}$ instruction 910 and the $k+1^{st}$ instruction 920 have similar bit streams than when the $k^{th}$ instruction 910 and the $k+1^{st}$ instruction 920 have significantly different bit streams. In particular embodiments, the compiler 600 may determine to perform the temporal-delta encoding when the temporal-delta encoded instruction 930 has a greater number of zero symbols than the original $k+1^{st}$ instruction. In particular embodiments, the compiler 600 may determine to perform the temporal-delta encoding under one or more suitable conditions. In particular embodiments, the compiler 600 may indicate whether a part of an instruction is temporal-delta encoded in an instruction header. Although this disclosure describes performing a temporal-delta encoding on a later instruction among two consecutive instructions that are to be executed by a control agent in a particular manner, this disclosure contemplates performing a temporal-delta encoding on a later instruction among two consecutive instructions that are to be executed by a control agent in any suitable manner.

In particular embodiments, the compiler 600 may perform a spatial-delta encoding on a later bit among two consecutive bits within an instruction. The spatial-delta encoding may comprise performing an exclusive OR operation between the two consecutive bits in the instruction. Following are pseudo codes for the spatial-delta encodings on an instruction:

```
spatial_delta_encoded[0] = instruction[0];
for (i=1; i<N; i++) {
    prev_bit = instruction[i−1];
    cur_bit = instruction[i];
    spatial_delta_encoded[i] = prev_bit ^ cur_bit;
}
```

Figure 9B:
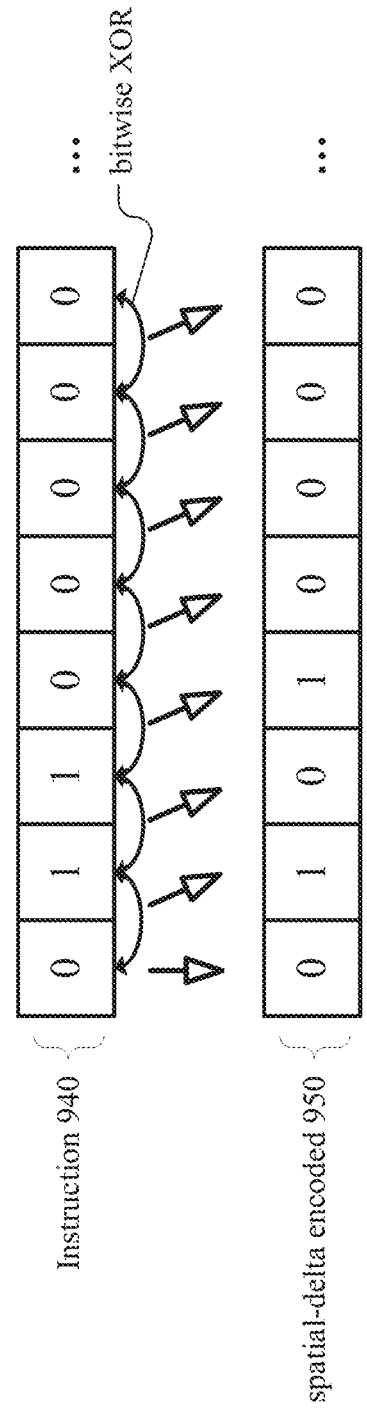
FIG. 9B illustrates example spatial-delta encodings on an instruction.

FIG. 9B illustrates example spatial-delta encodings on an instruction. As an example and not by way of limitation, illustrated in FIG. 9B, the compiler 600 may encode a later bit in a pair of consecutive bits of an original instruction 940 by performing a bitwise XOR operation on the pair of consecutive bits. A second bit from the beginning of the instruction 940 through the last bit of the instruction 940 may be spatial-delta encoded to produce a spatial-delta encoded instruction 950. In particular embodiments, the compiler 600 may determine to perform a spatial-delta encoding on an instruction when the output spatial-delta encoded instruction 950 has a greater number of zero symbols than the original instruction 940. In particular embodiments, the compiler 600 may determine to perform a spatial-delta encoding on an instruction when one or more suitable conditions are met. In particular embodiments, the compiler 600 may indicate whether an instruction is spatial-delta encoded in a compression data header associated with the instruction. Although this disclosure describes performing spatial-delta encodings on an instruction in a particular manner, this disclosure contemplates performing spatial-delta encodings on an instruction in any suitable manner.

Figure 10:
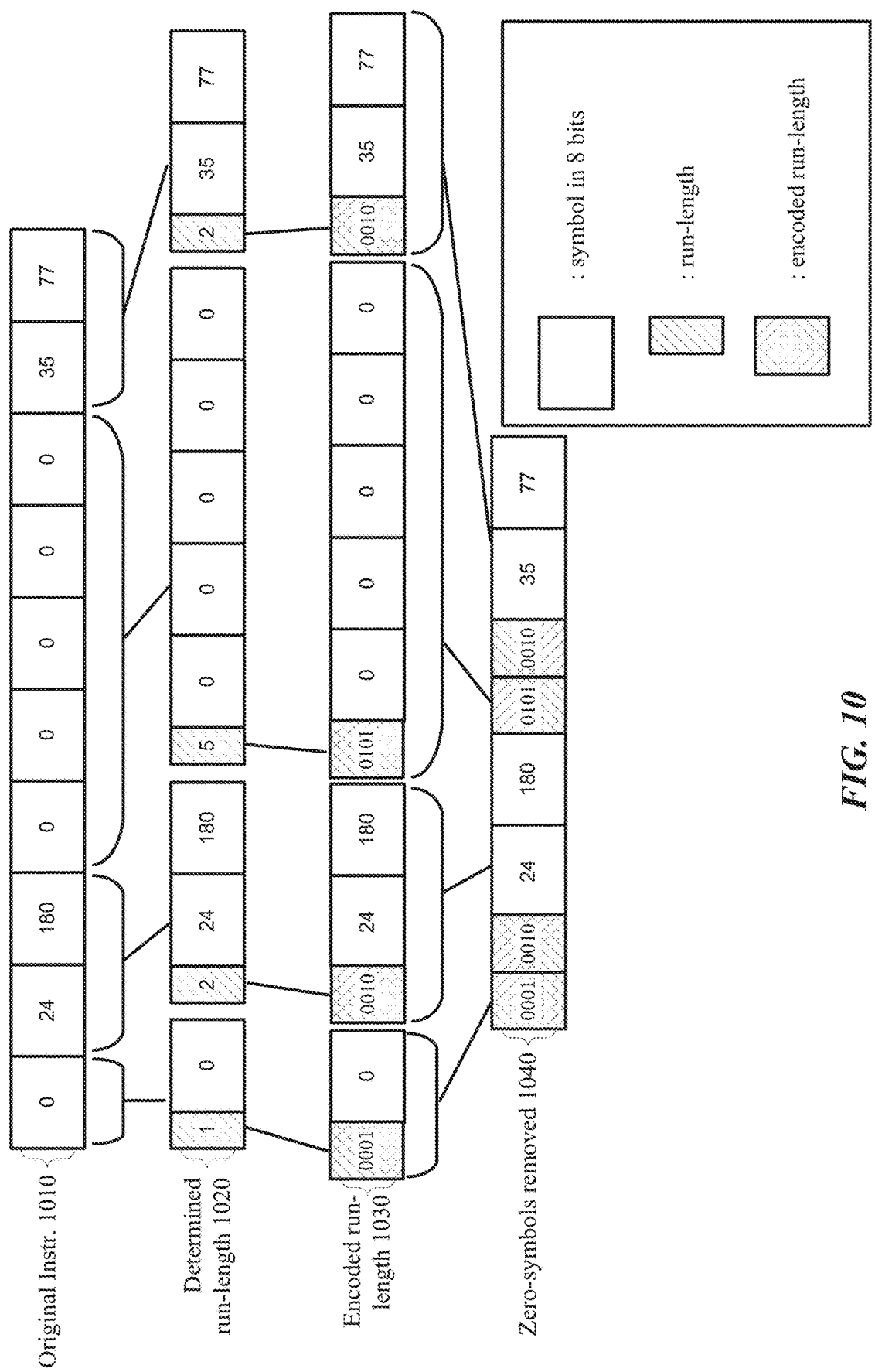
FIG. 10 illustrates an example run-length encoding-based compression on an instruction.

In particular embodiments, the compiler 600 may compress an instruction using a run-length encoding-based compression algorithm. The compiler 600 may replace one or more consecutive zero symbols in the instruction with a zero-symbol run-length field in the instruction. The zero-symbol run-length field may indicate a number of the one or more consecutive zero symbols. In order to replace the one or more consecutive zero symbols with a zero-symbol run-length field, the compiler 600 may determine a zero-symbol run-length for the one or more consecutive zero symbols in the instruction. The compiler 600 may encode the zero-symbol run-length into a zero-symbol run-length field that precedes the one or more consecutive zero symbols in the instruction. The compiler 600 may remove the one or more consecutive zero symbols from the instruction. In particular embodiments, the compiler 600 may add a non-zero-symbol run-length field in front of one or more consecutive non-zero symbols in the instruction. The non-zero-symbol run-length field may indicate a number of the one or more consecutive non-zero symbols. In order to add the non-zero-symbol run-length field in from of the one or more consecutive non-zero symbols in the instruction, the compiler 600 may determine a non-zero-symbol run-length for the one or more consecutive non-zero symbols in the instruction. The compiler 600 may encode the non-zero-symbol run-length into a non-zero-symbol run-length field that precedes the one or more consecutive non-zero symbols in the instruction. FIG. 10 illustrates an example run-length encoding-based compression on an instruction. As an example and not by way of limitation, illustrated in FIG. 10, an original instruction 1010 may comprise 10 symbols: 0, 24, 180, 0, 0, 0, 0, 0, 35, 77. Each symbol may comprise eight bits. The compiler 600 may determine a run-length for each of consecutive zero symbols and consecutive non-zero symbols. In the example illustrated in FIG. 10, the compiler 600 may determine 1 as a first zero-symbol run-length for the first symbol, 2 as a first non-zero-symbol run-length for the second through the third symbols, 5 as a second zero-symbol run-length for the fourth through eighth symbols, and 2 as a second non-zero-symbol run-length for the ninth through the tenth symbols as depicted in 1020. The compiler 600 may encode the determined run-length values into run-length fields as depicted in 1030. While the run-length encodings are four-bit binary-encoded values in the example illustrated in FIG. 10, any suitable encoding scheme may be used for the run-length fields. Each run-length fields may have zero or more extension-indicating blocks and a value block as explained later. The compiler 600 may remove zero symbols from the instruction to produce a compressed instruction as depicted in 1040. In particular embodiments, the compiler 600 may determine to compress an instruction when a size of the compressed instruction is smaller than a size of the original instruction. In particular embodiments, the compiler 600 may determine to compress an instruction when one or more suitable conditions are met. In particular embodiments, the compiler 600 may indicate whether the instruction is compressed in a compression data header associated with the instruction. Although this disclosure describes performing a run-length encoding-based compression on an instruction in a particular manner, this disclosure contemplates performing a run-length encoding-based compression on an instruction in any suitable manner.

Figure 11:
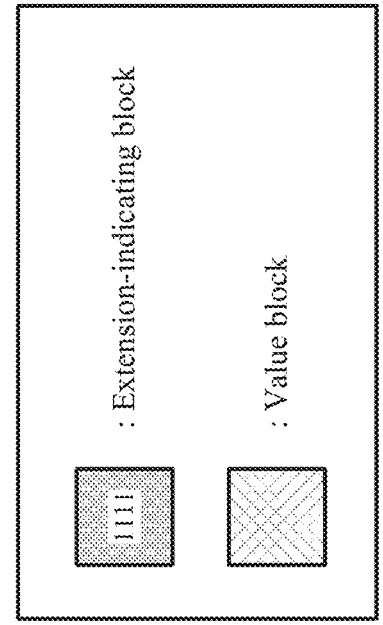
FIG. 11 illustrates an example run-length encoding scheme.

In particular embodiments, a run-length field may comprise zero or more extension-indicating blocks followed by a value block. A size of an extension-indicating block may be identical to a size of a value block. An extension-indicating block may contain a pre-determined bit pattern indicating a pre-determined value. A value of the run-length field may be determined by the pre-determined value times a number of extension-indicating blocks plus a value encoded in the value block. FIG. 11 illustrates an example run-length encoding scheme. As an example and not by way of limitation, illustrated in FIG. 11, a block within a run-length field may comprise four bits. Values 1 through 14 may be encoded in their corresponding binary representations. For a value exceeding 14 may be encoded using one or more extension-indicating blocks. An extension-indicating block may be represented by a pre-determined bit string. In the example illustrated in FIG. 11, an extension-indicating block is represented by a binary string 1111. The extension-indicating block may be associated with a pre-determined value. In the example illustrated in FIG. 11, an extension-indicating block is associated with a value 14. A value of a run-length field may be determined by the pre-determined value times a number of the extension-indicating block plus a value of a value block. For example, a value 15 is represented by an extension-indicating block followed by a value block with 0001 as depicted in FIG. 11. In another example, a value 16 is represented by an extension-indicating block followed by a value block of 0010 as depicted in FIG. 11. In yet another example, a value 30 may be represented by two consecutive extension-indicating blocks followed by a value block of 0010. Although FIG. 11 presents four-bit blocks, this disclosure contemplates any suitable block size. In particular embodiments, the extension-indicating block and the value block may not be next to each other for a non-zero symbol run-length field. For example, sixteen consecutive non-zero symbols may be encoded as a series of "1111" (an extension-indicating block), first fourteen non-zero symbols among the sixteen non-zero symbols, "0010" (a value block), and last two non-zero symbols in the sixteen non-zero symbols. Although this disclosure describes a particular run-length encoding scheme, this disclosure contemplates any suitable run-length encoding scheme.

In particular embodiments, an instruction master 702 may be communicably coupled to the one or more control agents 810A, 810B, . . . , 810N over an instruction bus 710. The instruction master 702 may be configured to access an instruction that is to be executed by a control agent among the one or more control agents 810A, 810B, . . . , 810N. In particular embodiments, the instruction master 702 may fetch the instruction from the data storage 805. In particular embodiments, the fetched instruction may be compressed. Although this disclosure describes accessing an instruction that is to be executed by a control agent in a machine-learning accelerator in a particular manner, this disclosure contemplates accessing an instruction that is to be executed by a control agent in a machine-learning accelerator in any suitable manner.

Figure 12:
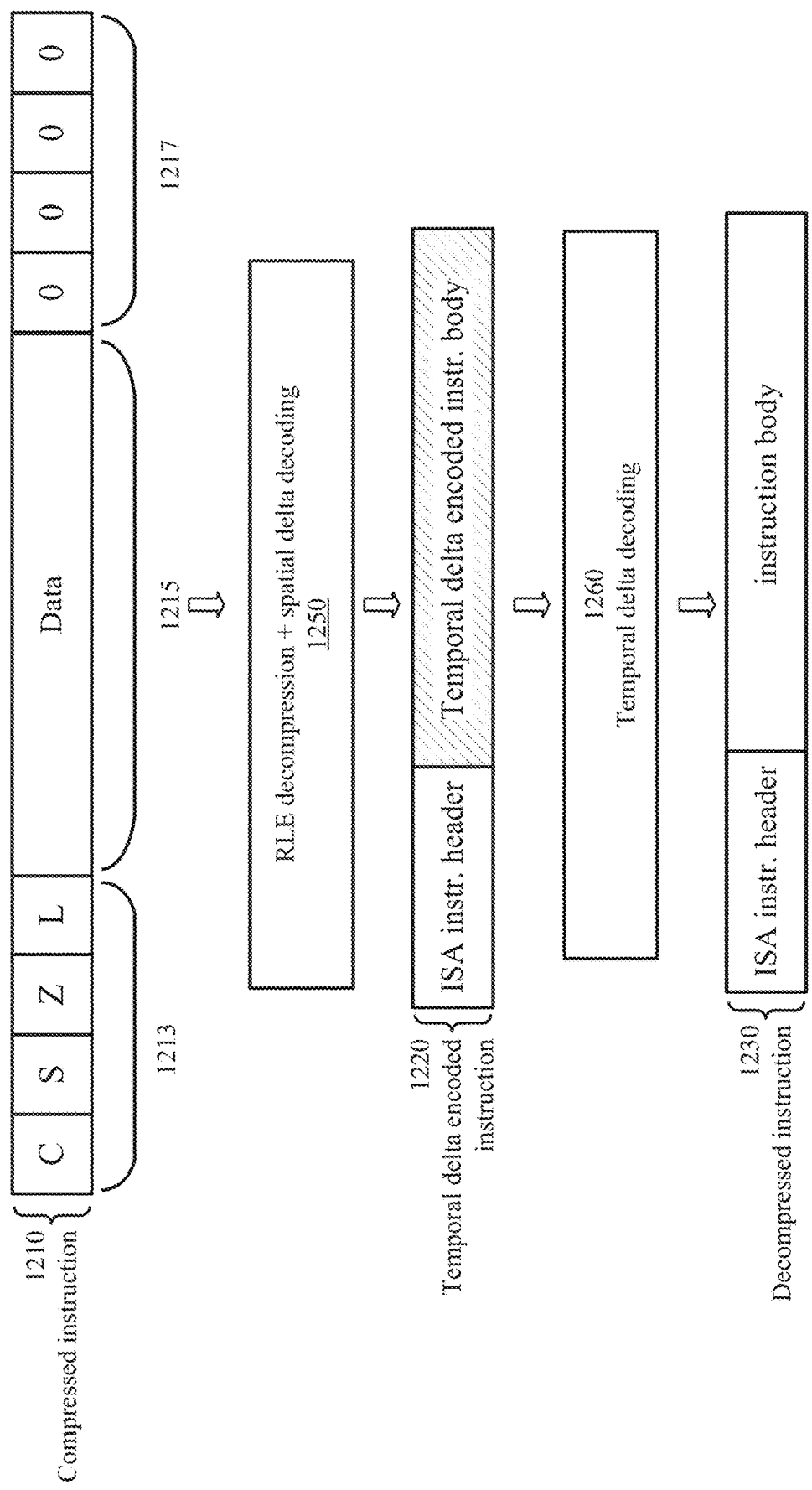
FIG. 12 illustrates example decompressing and decoding on an encoded and compressed instruction.

In particular embodiments, the instruction master 702 may be configured to determine whether the instruction is compressed based on a compression data header associated with the instruction. Based on the determination, the instruction master may be configured to decompress the instruction by replacing each of one or more zero-symbol run-length fields in the instruction with as many continuous zero symbols as its corresponding value and removing one or more non-zero-symbol run-length fields from the instruction. In particular embodiments, the compression data header may indicate whether the compressed instruction starts with one or more consecutive non-zero symbols. The instruction master 702 may determine whether the compressed instruction begins with one or more consecutive non-zero symbols or one or more consecutive zero symbols based on the compression header. The compressed instruction may comprise one or more zero-symbol run-length fields. A zero-symbol run-length field may indicate a number of consecutive zero symbols. The compressed instruction may comprise one or more consecutive non-zero symbols preceded by a non-zero-symbol run-length field indicating a number of the one or more consecutive non-zero symbols. FIG. 12 illustrates example decompressing and decoding on an encoded and compressed instruction. As an example and not by way of limitation, illustrated in FIG. 12, the instruction master 702 accesses a compressed instruction 1210 that is to be executed by a hardware control agent 810. The compressed instruction 1210 may comprise a compression data header 1213, data 1215, and an optional compression data footer 1217. The compression data header 1213 may comprise a number of fields indicating configurations associated with the compressed data. In the example illustrated in FIG. 12, the compression data header 1213 comprises C-bit indicating whether a run-length encoding-based compression is applied to the data 1215, S-bit indicating whether a spatial-delta encoding is applied to the data 1215, Z-bit indicating whether the compressed data 1215 starts with consecutive non-zero symbols, and L-bit indicating whether the current instruction is a last instruction of an instruction stream. Z-bit value may be ignored when C-bit value is zero. In particular embodiments, S-bit and Z-bit values may be ignored when C-bit value is zero. The compression data footer 1217 may indicate an end of the compressed instruction 1210. At step 1250, the instruction master 702 may determine whether the instruction is run-length encoding-based compressed based on the value of C-bit in the compression data header 1213. In response to the determination, the instruction master 702 may decompress the instruction by replacing each zero-symbol run-length field with as many continuous zero symbols as its corresponding value in the compressed data 1215 and removing each non-zero-symbol run-length fields from the compressed data 1215. The instruction master 702 may determine whether the compressed data begins with consecutive one or more non-zero symbols or one or more zero symbols based on a value of Z-bit within the compression data header 1213. Although this disclosure describes decompressing an instruction compressed with a run-length encoding-based compression algorithm in a particular manner, this disclosure contemplates decompressing an instruction compressed with a run-length encoding-based compression algorithm in any suitable manner.

In particular embodiments, the instruction master 702 may determine that the instruction is spatial-delta-encoded based on the compression data header associated with the instruction. In response to the determination, the instruction master may perform spatial-delta decoding on the instruction by orderly determining a spatial-delta-decoded value of each bit in the instruction. A spatial-delta-decoded value of a bit may be determined to be identical to a value of an immediately preceding bit when an encoded bit value is zero. A spatial-delta-decoded value of a bit may be determined to be opposite of the value of the immediately preceding bit when the encoded bit value is one. As an example and not by way of limitation, continuing with a prior example illustrated in FIG. 12, the instruction master 702 may continue the step 1250 by determining whether the data 1215 is spatial-delta encoded based on a value of S-bit in the compression data header 1213. In particular embodiments, the instruction master 702 may determine whether the data 1215 is spatial-delta encoded based on values of S-bit and C-bit in the compression data header 1213. In response to the determination, the instruction master 702 perform the spatial-delta decoding on the data 1215 by orderly determining a spatial-delta-decoded value of each bit in the data. If a spatial-delta encoded bit value is zero, the decoded value for the bit is identical to a value of an immediately preceding bit. If a spatial-delta encoded bit value is one, the decoded value for the bit is opposite of the value of the immediately preceding bit. At the end of step 1250, the instruction master 702 may strip off the compression data header 1213 and the compression data footer 1217 to get a decompressed and spatial-delta decoded instruction 1220. The decompressed and spatial-delta decoded instruction 1220 may be a temporal-delta encoded instruction as depicted in FIG. 12. The decompressed and spatial-delta decoded instruction 1220 may comprise an instruction header and instruction body. Although this disclosure describes performing spatial-delta decoding on an instruction in a particular manner, this disclosure contemplates performing spatial-delta decoding on an instruction in any suitable manner.

In particular embodiments, the instruction master 702 may cause the instruction to be sent to the control agent. The instruction master 702 may identify a target hardware control agent 810 for the instruction. Then, the instruction master 702 may send the instruction to the target hardware control agent 810. In particular embodiments, a timing of sending the instruction may be controlled by a synchronization mechanism. In particular embodiments, the synchronization may be done via a synchronization bus. Although this disclosure describes causing the instruction to be sent to a hardware control agent in a particular manner, this disclosure contemplates causing the instruction to be sent to a hardware control agent in any suitable manner.

In particular embodiments, the control agent 810 may perform a temporal-delta decoding on at least a part of the instruction when a header of the instruction indicates that the instruction is temporal-delta-encoded. A temporal-delta-decoded value of each bit within the at least part of the instruction may be determined to be identical to a value of a corresponding bit of an immediately preceding instruction when a temporal-delta-encoded value of the bit is zero. The temporal-delta-decoded value of each bit within the at least part of the instruction may be determined to be opposite of the value of the corresponding bit of the immediately preceding instruction when the temporal-delta-encoded value of the bit is one. As an example and not by way of limitation, continuing with a prior example illustrated in FIG. 12, the hardware control agent 810 may determine whether the instruction body is temporal-delta encoded based on the ISA instruction header associated with the instruction 1220 at step 1260. In response to the determination, the hardware control agent 810 may perform a temporal-delta decoding on the instruction body using an immediately preceding instruction. A temporal-delta-decoded value of each bit within the instruction body is determined to be identical to a value of a corresponding bit of the immediately preceding instruction when a temporal-delta-encoded value of the bit is zero. The temporal-delta-decoded value of each bit within the instruction body is determined to be opposite of the value of the corresponding bit of the immediately preceding instruction when the temporal-delta-encoded value of the bit is one. After the temporal-delta decoding is done, the decompressed instruction 1230 may be executed by the hardware control agent. Although this disclosure describes performing the temporal-delta decoding on an instruction in a particular manner, this disclosure contemplates performing the temporal-delta decoding on an instruction in any suitable manner.

Figure 13:
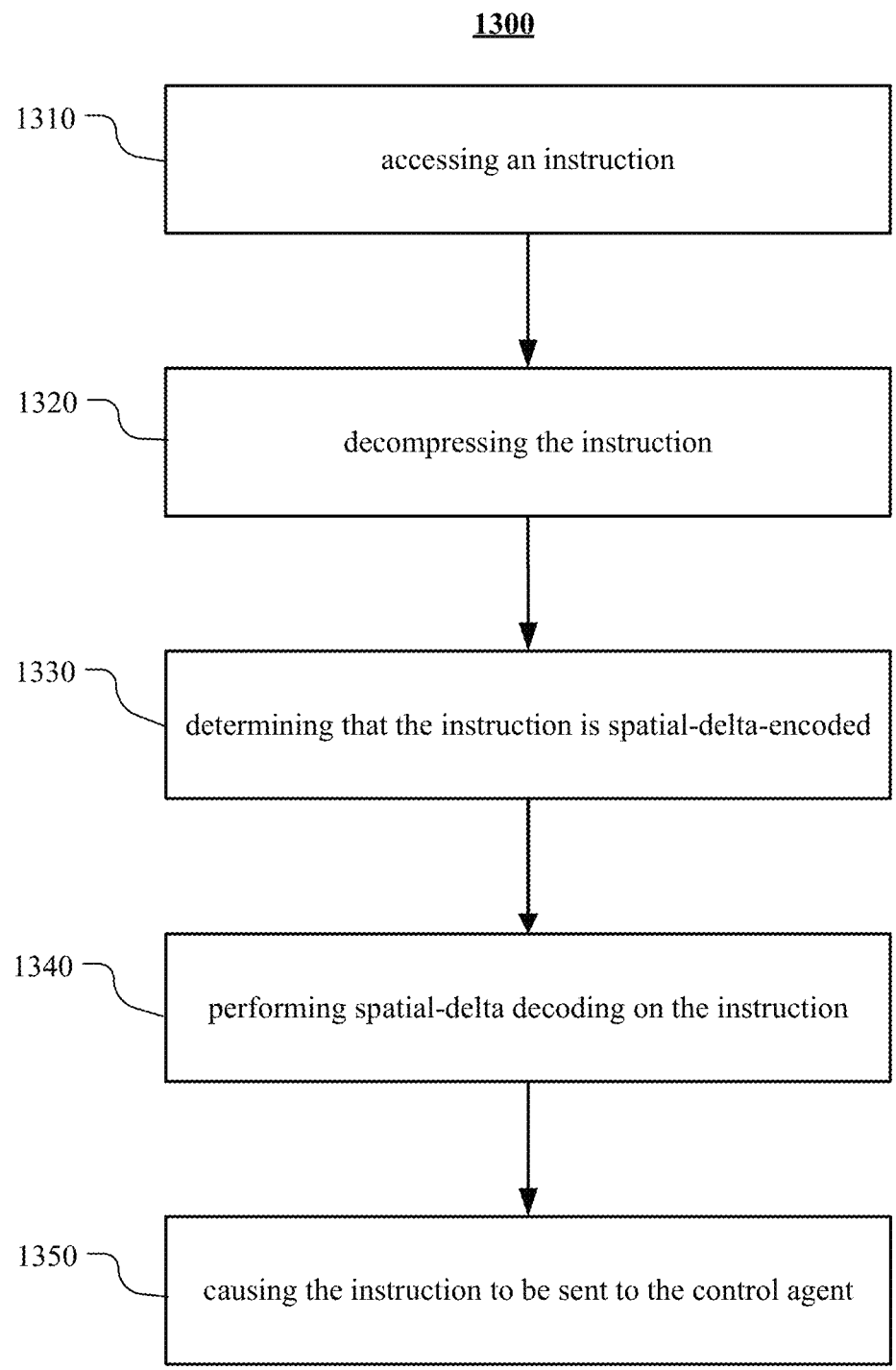
FIG. 13 illustrates an example method by an instruction master of a machine-learning accelerator for decompressing and decoding a compressed instruction that is to be executed by a control agent

FIG. 13 illustrates an example method 1300 by an instruction master of a machine-learning accelerator for decompressing and decoding a compressed instruction that is to be executed by a control agent. The instruction master may be communicably coupled to one or more control agents of the machine-learning accelerator over an instruction bus. The method may begin at step 1310, where the instruction master may access an instruction that is to be executed by a control agent among the one or more control agents. At step 1320, the instruction master may decompress the instruction by replacing each of one or more zero-symbol run-length fields in the instruction with as many continuous zero symbols as its corresponding value and removing one or more non-zero-symbol run-length fields from the instruction. At step 1330, the instruction master may determine that the instruction is spatial-delta-encoded based on a compression data header associated with the instruction. At step 1340, the instruction master may perform spatial-delta decoding on the instruction by orderly determining a spatial-delta-decoded value of each bit in the instruction in response to the determination. The instruction master may determine a spatial-delta-decoded value of a bit is identical to a value of an immediately preceding bit when an encoded bit value is zero. The instruction master may determine the spatial-delta-decoded value of a bit is opposite of the value of the immediately preceding bit when the encoded bit value is one. At step 1350, the instruction master may cause the instruction to be sent to the control agent. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method by an instruction master of a machine-learning accelerator for decompressing and decoding a compressed instruction that is to be executed by a control agent including the particular steps of the method of FIG. 13, this disclosure contemplates any suitable method by an instruction master of a machine-learning accelerator for decompressing and decoding a compressed instruction that is to be executed by a control agent including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
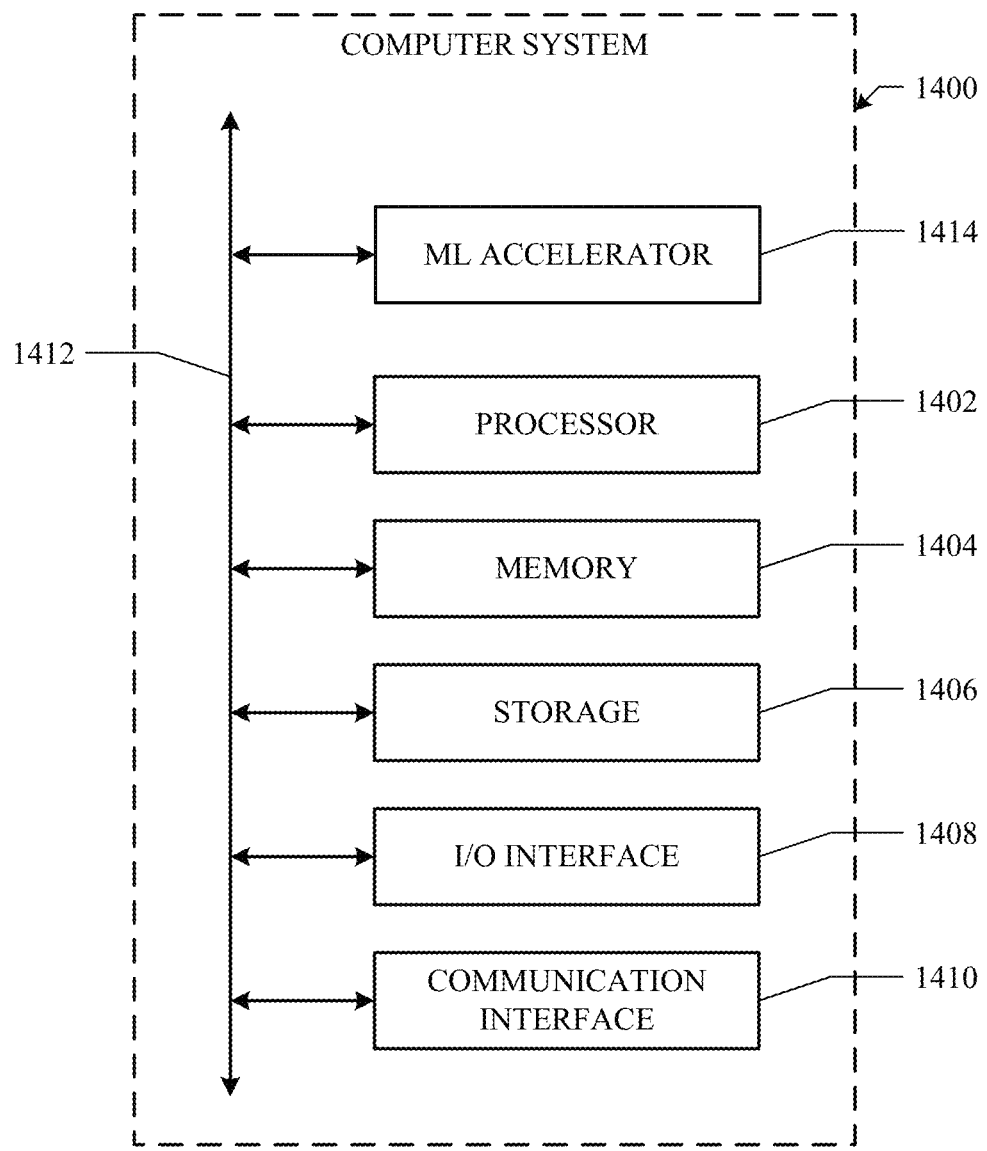
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412, and an ML accelerator 1414. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, ML accelerator 1414 may be similar to ML accelerator 614 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1414, as described herein. In particular embodiments, ML accelerator 1414 may be implemented using hardware and/or software elements in any suitable combination. As described herein, ML accelerator 1414 may include multiple tensor processor clusters and underlying tensor processors, each of which may include local memory for storing input features, weights for 2D kernels of various multi-dimensional filters, and/or output features of various convolution operations (not shown in FIG. 14). In particular embodiments, these local memories may be loaded from storage 1406, memory 1404, or from another source (such as, for example, another computer system 1400). The use of ML accelerator 1414 to execute the tensor instructions may improve the overall performance and resource utilization of computer system 1400 for those applications when compared to executing them using processor 1402 or using an existing ML accelerator.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing system for accelerating machine-learning computations, comprising:
    one or more control agents, and
    an instruction master, which is communicably coupled to the one or more control agents over an instruction bus, that is configured to:
        access an instruction that is to be executed by a control agent among the one or more control agents;
        decompress the instruction by replacing each of one or more zero-symbol run-length fields in the instruction with as many continuous zero symbols as indicated by a corresponding value of the zero-symbol run-length field and removing one or more non-zero-symbol run-length fields from the instruction;
        determine that the instruction is spatial-delta-encoded based on a compression data header associated with the instruction;
        perform, in response to the determination, spatial-delta decoding on the instruction by orderly determining a spatial-delta-decoded value of each bit in the instruction, wherein a spatial-delta-decoded value of a bit is determined to be:
            identical to a value of an immediately preceding bit when an encoded bit value is zero; or
            opposite of the value of the immediately preceding bit when the encoded bit value is one; and
        cause the instruction to be sent to the control agent.

2. The computing system of claim 1, wherein the control agent performs a temporal-delta decoding on at least a part of the instruction when a header of the instruction indicates that the instruction is temporal-delta-encoded.

3. The computing system of claim 2, wherein, during the temporal-delta decoding, a temporal-delta-decoded value of each bit within the at least part of the instruction is determined to be:
    identical to a value of a corresponding bit of an immediately preceding instruction when a temporal-delta-encoded value of the bit is zero; or
    opposite of the value of the corresponding bit of the immediately preceding instruction when the temporal-delta-encoded value of the bit is one.

4. The computing system of claim 1, wherein the instruction master is further configured to:
    determine, before decompressing the instruction, whether the instruction is compressed based on the compression data header.

5. The computing system of claim 1, wherein the compression data header indicates whether the instruction is a compressed instruction and, if so, whether the compressed instruction starts with a set of one or more consecutive non-zero symbols.

6. The computing system of claim 5, wherein the compressed instruction comprises the set of one or more consecutive non-zero symbols preceded by a non-zero-symbol run-length field indicating a number of the set of one or more consecutive non-zero symbols.

7. The computing system of claim 6, wherein the non-zero-symbol run-length field comprises zero or more extension-indicating blocks followed by a value block, and wherein a size of an extension-indicating block is identical to a size of the value block.

8. The computing system of claim 7, wherein the extension-indicating block contains a pre-determined bit pattern indicating a pre-determined value.

9. The computing system of claim 8, wherein a value of the non-zero-symbol run-length field is determined by the pre-determined value times a number of extension-indicating blocks plus a value encoded in the value block.

10. The computing system of claim 1, wherein the zero-symbol run-length field indicates a number of consecutive zero symbols.

11. The computing system of claim 1, wherein the instruction is generated, encoded, and compressed by a compiler associated with the computing system.

12. The computing system of claim 11, wherein the compiler performs a temporal-delta encoding on a later instruction among two consecutive instructions that are to be performed by a single control agent, and wherein the temporal-delta encoding comprises performing bitwise exclusive OR operations between the two consecutive instructions.

13. The computing system of claim 11, wherein the compiler performs a spatial-delta encoding on a later bit among two consecutive bits within an instruction, wherein the spatial-delta encoding comprises performing an exclusive OR operation between the two consecutive bits within the instruction.

14. The computing system of claim 11, wherein compressing the instruction comprises replacing one or more consecutive zero symbols in the instruction with a zero-symbol run-length field indicating a number of the one or more consecutive zero symbols and adding a non-zero-symbol run-length field in front of one or more consecutive non-zero symbols in the instruction, wherein the non-zero-symbol run-length field indicates a number of the one or more consecutive non-zero symbols.

15. One or more computer-readable non-transitory storage media embodying software that is operable when executed by an instruction master of a computing system that is communicably coupled to one or more control agents of the computing system over an instruction bus to:
  access an instruction that is to be executed by a control agent among the one or more control agents;
  decompress the instruction by replacing each of one or more zero-symbol run-length fields in the instruction with as many continuous zero symbols as indicated by a corresponding value of the zero-symbol run-length field and removing one or more non-zero-symbol run-length fields from the instruction;
  determine that the instruction is spatial-delta-encoded based on a compression data header associated with the instruction;
  perform, in response to the determination, spatial-delta decoding on the instruction by orderly determining a spatial-delta-decoded value of each bit in the instruction, wherein a spatial-delta-decoded value of a bit is determined to be:
    identical to a value of an immediately preceding bit when an encoded bit value is zero; or
    opposite of the value of the immediately preceding bit when the encoded bit value is one; and
  cause the instruction to be sent to the control agent.

16. The one or more computer-readable non-transitory storage media of claim 15, wherein the control agent performs a temporal-delta decoding on at least a part of the instruction when a header of the instruction indicates that the instruction is temporal-delta-encoded.

17. The one or more computer-readable non-transitory storage media of claim 16, wherein, during the temporal-delta decoding, a temporal-delta-decoded value of each bit within the at least part of the instruction is determined to be:
  identical to a value of a corresponding bit of an immediately preceding instruction when a temporal-delta-encoded value of the bit is zero; or
  opposite of the value of the corresponding bit of the immediately preceding instruction when the temporal-delta-encoded value of the bit is one.

18. The one or more computer-readable non-transitory storage media of claim 15, wherein the instruction master is further configured to:
  determine, before decompressing the instruction, whether the instruction is compressed based on the compression data header.

19. The one or more computer-readable non-transitory storage media of claim 15, wherein the compression data header indicates whether the instruction is a compressed instruction and, if so, whether the compressed instruction starts with one or more consecutive non-zero symbols.

20. A method comprising, by an instruction master of a computing system that is communicably coupled to one or more control agents of the computing system over an instruction bus:
  accessing an instruction that is to be executed by a control agent among the one or more control agents;
  decompressing the instruction by replacing each of one or more zero-symbol run-length fields in the instruction with as many continuous zero symbols as indicated by a corresponding value of the zero-symbol run-length field and removing one or more non-zero-symbol run-length fields from the instruction;
  determining that the instruction is spatial-delta-encoded based on a compression data header associated with the instruction;
  performing, in response to the determination, spatial-delta decoding on the instruction by orderly determining a spatial-delta-decoded value of each bit in the instruction, wherein a spatial-delta-decoded value of a bit is determined to be:
  identical to a value of an immediately preceding bit when an encoded bit value is zero; or
  opposite of the value of the immediately preceding bit when the encoded bit value is one; and
  causing the instruction to be sent to the control agent.

* * * * *